United States Patent
Yuwaki et al.

(10) Patent No.: US 11,014,298 B2
(45) Date of Patent: May 25, 2021

(54) THREE-DIMENSIONAL SHAPING APPARATUS AND CONTROL METHOD FOR THREE-DIMENSIONAL SHAPING APPARATUS

(71) Applicant: Seiko Epson Corporation, Tokyo (JP)

(72) Inventors: Kohei Yuwaki, Shiojiri (JP); Koichi Saito, Matsumoto (JP); Kazuhide Nakamura, Asahi (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/690,277

(22) Filed: Nov. 21, 2019

(65) Prior Publication Data

US 2020/0164575 A1    May 28, 2020

(30) Foreign Application Priority Data

Nov. 22, 2018 (JP) .............................. JP2018-219002

(51) Int. Cl.
  *B29C 64/209* (2017.01)
  *B29C 64/245* (2017.01)
  (Continued)

(52) U.S. Cl.
  CPC .......... *B29C 64/209* (2017.08); *B29C 64/245* (2017.08); *B29C 64/321* (2017.08);
  (Continued)

(58) Field of Classification Search
  CPC ....... B29C 64/35; B29C 48/02; B29C 64/209; B29C 64/393; B29C 64/106
  (Continued)

(56) References Cited

U.S. PATENT DOCUMENTS

| | | | | |
|---|---|---|---|---|
| 4,107,246 A | * | 8/1978 | LaSpisa | G05D 7/0605 264/40.7 |
| 5,522,720 A | * | 6/1996 | Schad | B29C 45/20 264/297.2 |

(Continued)

FOREIGN PATENT DOCUMENTS

| | | | | |
|---|---|---|---|---|
| EP | 2772347 A1 | * | 9/2014 | .......... B29C 64/106 |
| EP | 3581365 A1 | * | 12/2019 | .......... B29C 64/112 |

(Continued)

*Primary Examiner* — Joseph S Del Sole
*Assistant Examiner* — Margaret B Hayes
(74) *Attorney, Agent, or Firm* — Harness, Dickey & Pierce, P.L.C.

(57) ABSTRACT

A three-dimensional shaping apparatus includes a supply channel through which a shaping material supplied from a melting section flows, a first branch channel and a second branch channel, a coupling section configured to couple the supply channel and the first branch channel and the second branch channel, a first nozzle communicating with the first branch channel, a second nozzle communicating with the second branch channel and having a nozzle diameter larger than a nozzle diameter of the first nozzle, a valve mechanism provided in the coupling section, and a control section. When switching a state in which the supply channel and the first branch channel communicate and the supply channel and the second branch channel are cut off to a state in which the supply channel and the second branch channel communicate and the supply channel and the first branch channel are cut off, prior to ejection of the shaping material from the second nozzle to a shaping region, the control section discharges the shaping material remaining in the second branch channel from the second nozzle to a region different from the shaping region.

6 Claims, 13 Drawing Sheets

(51) Int. Cl.
*B29C 64/321* (2017.01)
*B33Y 40/00* (2020.01)
*B33Y 10/00* (2015.01)
*B33Y 30/00* (2015.01)

(52) U.S. Cl.
CPC ............... *B33Y 10/00* (2014.12); *B33Y 30/00* (2014.12); *B33Y 40/00* (2014.12)

(58) Field of Classification Search
USPC .......................................................... 347/45
See application file for complete search history.

(56) References Cited

U.S. PATENT DOCUMENTS

| | | | | |
|---|---|---|---|---|
| 5,633,021 | A | * | 5/1997 | Brown .................... B29C 64/40 425/375 |
| 5,641,526 | A | | 6/1997 | Gellert |
| 5,747,077 | A | * | 5/1998 | Yoshida .............. B29C 48/0022 425/183 |
| 6,019,916 | A | * | 2/2000 | Mizuguchi ............ B29C 48/385 264/39 |
| 2014/0291886 | A1 | * | 10/2014 | Mark .................... B29C 69/001 264/163 |
| 2016/0009010 | A1 | * | 1/2016 | Kariya .................... B29B 7/248 264/328.18 |
| 2016/0046073 | A1 | * | 2/2016 | Hadas .................... B29C 48/345 264/211.21 |
| 2017/0157828 | A1 | * | 6/2017 | Mandel ................. B29C 64/209 |
| 2017/0210069 | A1 | * | 7/2017 | Stubenruss ........... B29C 64/118 |
| 2019/0255755 | A1 | * | 8/2019 | Mandel .................. B29C 48/02 |

FOREIGN PATENT DOCUMENTS

| | | | |
|---|---|---|---|
| JP | H09-220736 A | | 8/1997 |
| JP | 2006-192710 A | | 7/2006 |
| JP | 2009137260 A | * | 6/2009 ........... B29C 45/464 |

\* cited by examiner

THREE-DIMENSIONAL SHAPING APPARATUS AND CONTROL METHOD FOR THREE-DIMENSIONAL SHAPING APPARATUS

The present application is based on, and claims priority from, JP Application Serial Number 2018-219002, filed Nov. 22, 2018, the disclosure of which is hereby incorporated by reference herein in its entirety.

BACKGROUND

1. Technical Field

The present disclosure relates to a three-dimensional shaping apparatus and a control method for the three-dimensional shaping apparatus.

2. Related Art

For example, JP-A-2006-192710 (Patent Literature 1) discloses a three-dimensional shaping apparatus that extrudes a melted thermoplastic material from an extrusion nozzle, which is scanned according to preset shape data, onto a base and further stacks a melted material on the material hardened on the base to create a three-dimensional shaped object.

In the three-dimensional shaping apparatus explained above, the three-dimensional shaped object is shaped by one nozzle. Therefore, when shaping accuracy is improved using a small-diameter nozzle, shaping speed is reduced and, when the shaping speed is improved using a large-diameter nozzle, the shaping accuracy is deteriorated. On the other hand, in a multi-nozzle three-dimensional shaping apparatus including a large-diameter nozzle and a small-diameter nozzle, both of the shaping accuracy and the shaping speed can be improved by shaping a three-dimensional shaped object while switching the nozzles. However, the present inventors found that, in the multi-nozzle three-dimensional shaping apparatus, a shaping material remaining in the nozzle, in which ejection of the shaping material is stopped by the switching of the nozzles, is sometimes denatured to affect shaping quality after the ejection is resumed. Therefore, the present disclosure suppresses deterioration in the quality of a three-dimensional shaped object shaped by the multi-nozzle three-dimensional shaping apparatus.

SUMMARY

According to an aspect of the present disclosure, a three-dimensional shaping apparatus is provided. The three-dimensional shaping apparatus includes: a melting section configured to melt a material into a shaping material; a supply channel through which the shaping material supplied from the melting section flows; a first branch channel and a second branch channel to which the shaping material is supplied from the supply channel; a coupling section configured to couple the supply channel and the first branch channel and the second branch channel; a first nozzle communicating with the first branch channel; a second nozzle communicating with the second branch channel and having a nozzle diameter larger than a nozzle diameter of the first nozzle; a valve mechanism provided in the coupling section; a shaping table on which the shaping material ejected from the first nozzle and the second nozzle is stacked; a moving mechanism configured to change relative positions of the first nozzle and the second nozzle and the shaping table; and a control section configured to control the melting section, the valve mechanism, and the moving mechanism to thereby execute shaping processing for shaping a three-dimensional shaped object in a shaping region of the shaping table. The control section controls the valve mechanism to thereby switch a first state in which the supply channel and the first branch channel communicate and the supply channel and the second branch channel are cut off and a second state in which the supply channel and the second branch channel communicate and the supply channel and the first branch channel are cut off. In the shaping processing, when switching the second state to the first state, prior to the ejection of the shaping material from the first nozzle to the shaping region, the control section supplies the shaping material from the supply channel to the first branch channel to thereby execute first material purge processing for discharging the shaping material remaining in the first branch channel from the first nozzle to a region different from the shaping region and, when switching the first state to the second state, the control section supplies the shaping material from the supply channel to the second branch channel to thereby, prior to the ejection of the shaping material from the second nozzle to the shaping region, execute second material purge processing for discharging the shaping material remaining in the second branch channel from the second nozzle to a region different from the shaping region.

DESCRIPTION OF EXEMPLARY EMBODIMENTS

A. First Embodiment

Figure 1:
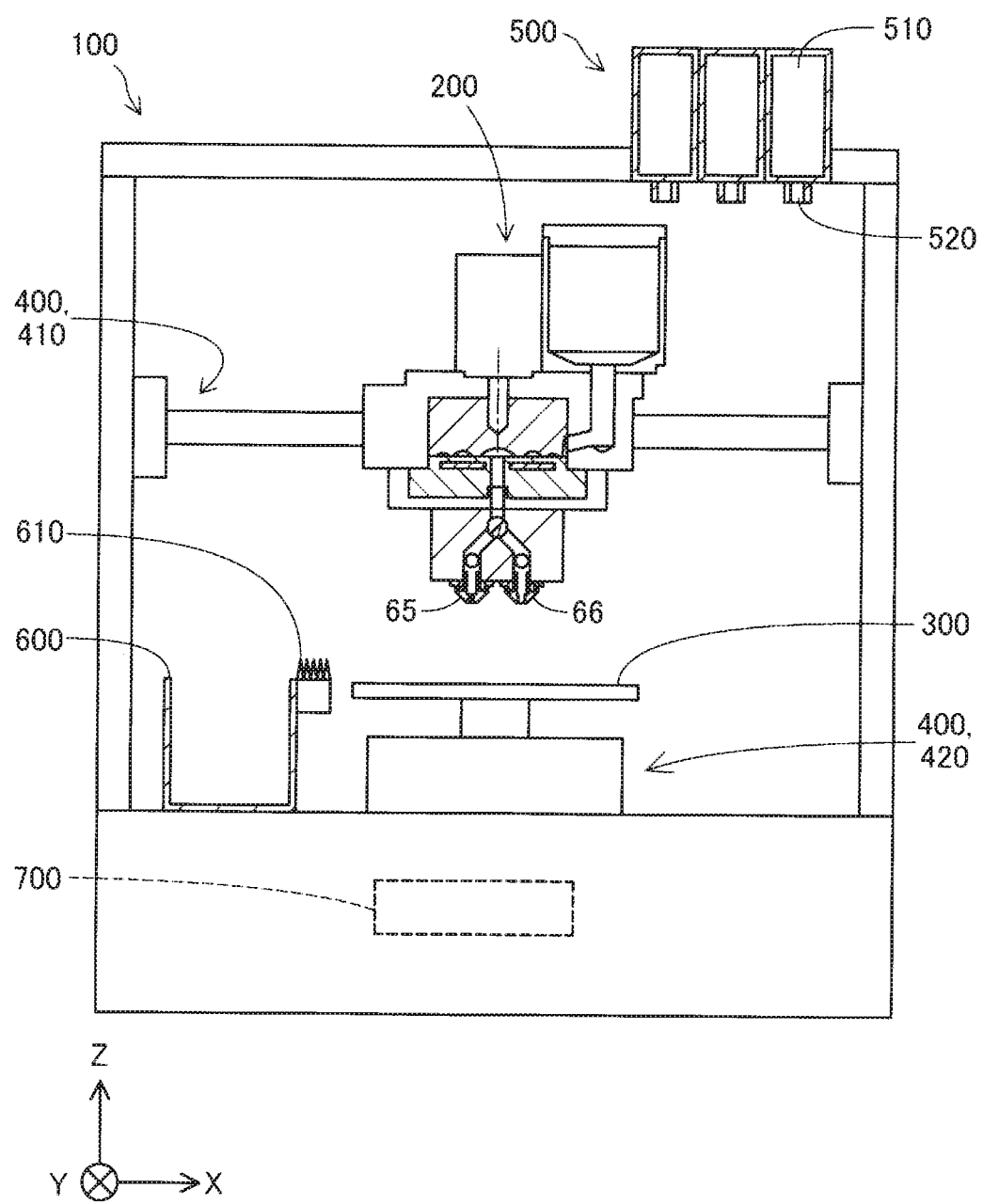
FIG. 1 is an explanatory diagram showing a schematic configuration of a three-dimensional shaping apparatus in a first embodiment.

FIG. 1 is an explanatory diagram showing a schematic configuration of a three-dimensional shaping apparatus 100 in a first embodiment. The three-dimensional shaping apparatus 100 in this embodiment includes an ejection unit 200, a shaping table 300, a moving mechanism 400, a material supplying mechanism 500, a waste-material storing section 600, and a control section 700. Under control by the control section 700, while ejecting a shaping material from a first nozzle 65 or a second nozzle 66 provided in the ejection unit 200 toward the shaping table 300, the three-dimensional shaping apparatus 100 changes, with the moving mechanism 400, relative positions of the first nozzle 65 and the second nozzle 66 and the shaping table 300 to thereby shape a three-dimensional shaped object having a desired shape on the shaping table 300. In this embodiment, the control section 700 shapes the three-dimensional shaped object while switching the ejection of the shaping material from the first nozzle 65 and the ejection of the shaping material from the second nozzle 66. A detailed configuration of the ejection unit 200 is explained below with reference to FIG. 2.

The moving mechanism 400 moves each of the ejection unit 200 and the shaping table 300 to thereby change three-dimensional relative positions of the first nozzle 65 and the second nozzle 66 and the shaping table 300. In this embodiment, the moving mechanism 400 is configured by a first moving mechanism 410 that moves the ejection unit 200 and a second moving mechanism 420 that moves the shaping table 300. The first moving mechanism 410 is configured to be capable of moving the ejection unit 200 in two axial directions of an X direction and a Y direction. The second moving mechanism 420 is configured to be capable of moving the shaping table 300 in a Z direction. The first moving mechanism 410 moves the ejection unit 200 with a driving force of a motor. The second moving mechanism 420 moves the shaping table 300 with a driving force of a motor. The motors are driven under the control by the control section 700.

The material supplying mechanism 500 is provided above the ejection unit 200 in the three-dimensional shaping apparatus 100. The material supplying mechanism 500 supplies a material used for shaping of a three-dimensional shaped object to the ejection unit 200 moved to below the material supplying mechanism 500 by the first moving mechanism 410. The material supplying mechanism 500 includes a plurality of sets of storage sections 510 that store materials and supply ports 520 provided below the storage sections 510. ON and OFF of the supply of the materials is switched by opening and closing of the supply ports 520. For example, the supply ports 520 are opened and closed by shutters opened and closed by motors driven under the control by the control section 700.

In this embodiment, different kinds of materials are respectively stored in a plurality of storage sections 510. For example, a material forming a shaping material of a three-dimensional shaped object, a support material used for shaping of the three-dimensional shaped object, and a purge material for cleaning the inside of the ejection unit 200 are stored in the storage sections 510. The ejection unit 200 receives supply of a desired material from the supply port 520 of the storage section 510 that stores the desired material.

The waste-material storing section 600 is provided adjacent to the shaping table 300. In this embodiment, the waste-material storing section 600 is a box opened upward. The waste-material storing section 600 stores the shaping material discharged from the first nozzle 65 and the second nozzle 66 of the ejection unit 200 moved to above the waste-material storing section 600 by the first moving mechanism 410. The waste-material storing section 600 may store the support material and the purge material discharged from the first nozzle 65 and the second nozzle 66 besides the shaping material discharged from the first nozzle 65 and the second nozzle 66.

In this embodiment, a nozzle cleaning member 610 for cleaning the tip portion of the first nozzle 65 and the tip portion of the second nozzle 66 is provided in an outer circumferential portion of an opening in the waste-material storing section 600. The nozzle cleaning member 610 in this embodiment is a brush disposed with bristle ends facing upward. The nozzle cleaning member 610 may be a sheet made of resin or synthetic leather.

The control section 700 is configured by a computer including one or more processors, a main storage device, and an input and output interface that performs input and output of signals from and to the outside. In this embodiment, the processors execute programs and commands read onto the main storage device, whereby the control section 700 exerts various functions. The control section 700 may be configured by a combination of a plurality of circuits rather than by the computer.

Figure 2:
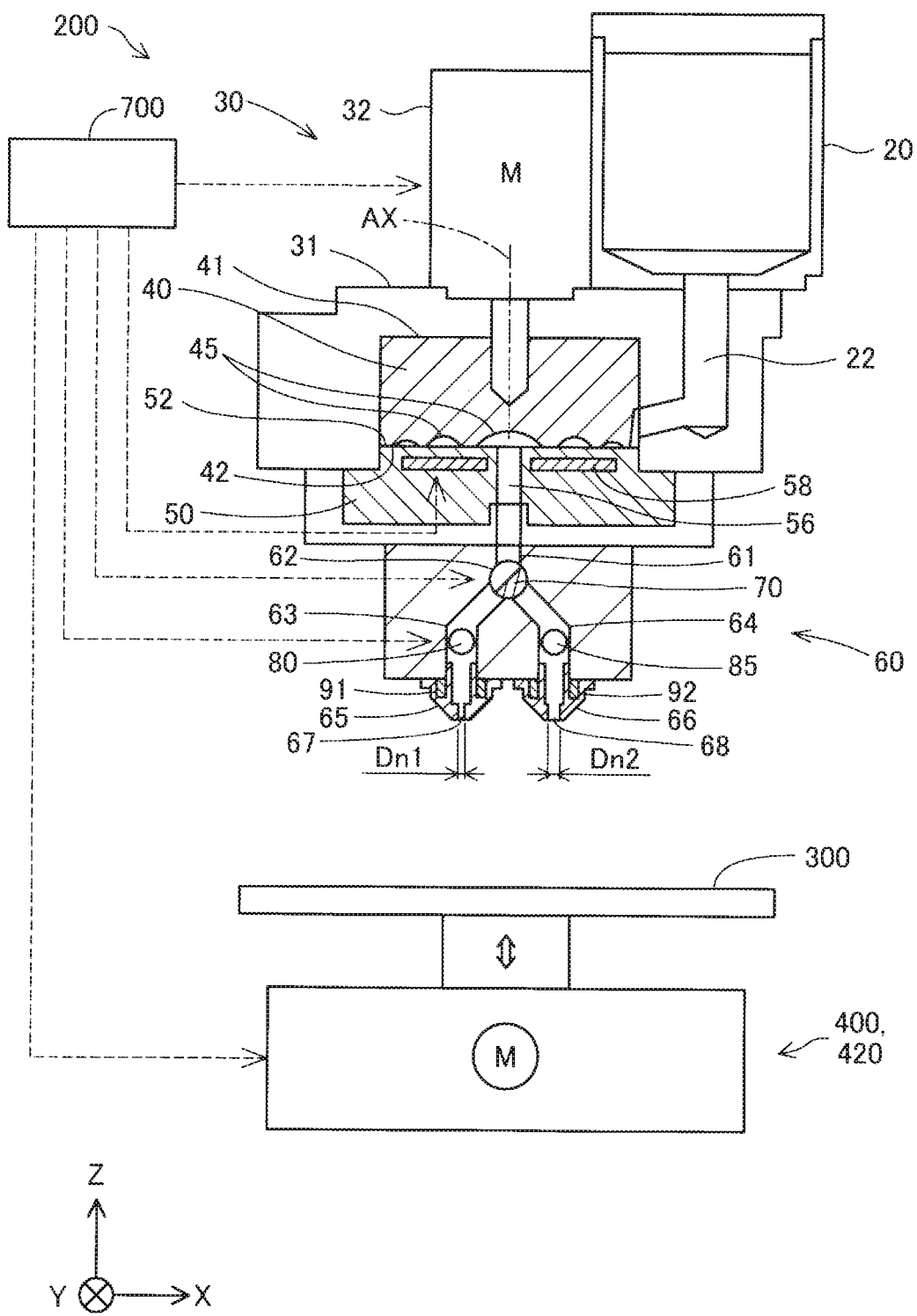
FIG. 2 is an explanatory diagram showing a schematic configuration of an ejection unit in the first embodiment.

FIG. 2 is an explanatory diagram showing a schematic configuration of the ejection unit 200 in this embodiment. The ejection unit 200 in this embodiment includes a material storage section 20, a melting section 30, an ejecting section 60, a first suction section 80, and a second suction section 85.

The material storage section 20 stores a material in a state of pellets or powder supplied from the material supplying mechanism 500. The material in this embodiment is pellet-like ABS resin. The material storage section 20 in this embodiment is configured by a hopper. The material storage section 20 and the melting section 30 are coupled by a supply path 22 provided below the material storage section 20. The material stored in the material storage section 20 is supplied to the melting section 30 via the supply path 22.

The melting section 30 includes a screw case 31, a driving motor 32, a flat screw 40, and a barrel 50. The melting section 30 melts at least a part of a material in a solid state, which is supplied from the material storage section 20, into a paste-like shaping material having fluidity and supplies the shaping material to the first nozzle 65 and the second nozzle 66. The flat screw 40 is sometimes simply referred to as screw as well.

The screw case 31 is a housing that houses the flat screw 40. The driving motor 32 is fixed on the upper surface of the screw case 31. The driving motor 32 is coupled to an upper surface 41 of the flat screw 40.

The flat screw 40 has a substantially columnar shape, the height of which in a direction along a center axis AX is smaller than the diameter thereof. The flat screw 40 is disposed in the screw case 31 such that the center axis AX is parallel to the Z direction. The flat screw 40 rotates around the center axis AX in the screw case 31 with torque generated by the driving motor 32.

The flat screw 40 includes a groove forming surface 42 on the opposite side of the upper surface 41 in the direction along the center axis AX. A groove section 45 is formed on the groove forming surface 42. A detailed shape of the groove forming surface 42 of the flat screw 40 is explained below with reference to FIG. 8.

The barrel 50 is provided below the flat screw 40. The barrel 50 includes a screw counter surface 52 opposed to the groove forming surface 42 of the flat screw 40. In the barrel 50, a heater 58 is incorporated in a position opposed to the groove section 45 of the flat screw 40. The temperature of the heater 58 is controlled by the control section 700. The heater 58 is sometimes referred to as heating section.

A communication hole 56 is provided in the center of the screw counter surface 52. The communication hole 56 communicates with the ejecting section 60. A detailed shape of the screw counter surface 52 of the barrel 50 is explained below with reference to FIG. 9.

The ejecting section 60 includes a supply channel communicating with the communication hole 56 of the barrel 50, the shaping material supplied from the melting section 30 flowing through the supply channel 61, a first branch channel 63 and a second branch channel 64 to which the shaping material is supplied from the supply channel 61, a coupling section 62 that couples the supply channel 61 and the first branch channel 63 and the second branch channel 64, the first nozzle 65 communicating with the first branch channel 63, the second nozzle 66 communicating with the second branch channel 64, and a valve mechanism 70 provided in the coupling section 62. The shaping material supplied to the ejecting section 60 is ejected from one of the first nozzle 65 and the second nozzle 66 toward the shaping table 300. The valve mechanism 70 switches the ejection of the shaping material from the first nozzle 65 and the ejection of the shaping material from the second nozzle 66.

In this embodiment, a nozzle diameter Dn2 of the second nozzle 66 is larger than a nozzle diameter Dn1 of the first nozzle 65. The nozzle diameter Dn1 of the first nozzle 65 is a minimum diameter in a first nozzle hole 67. The nozzle diameter Dn2 of the second nozzle 66 is a minimum diameter in a second nozzle hole 68. The first nozzle hole is a portion with a reduced channel cross section provided at an end portion on a side communicating with the atmosphere in the first nozzle 65. The second nozzle hole is a portion with a reduced channel cross section provided at an end portion on a side communicating with the atmosphere in the second nozzle 66.

In this embodiment, a first nozzle heater 91 that heats the first nozzle 65 and a second nozzle heater 92 that heats the second nozzle 66 are provided in the ejecting section 60. ON and OFF of heating by the first nozzle heater 91 and the second nozzle heater 92 is switched by the control section 700. Fluidity of the shaping material in the first nozzle 65 can be improved by heating the first nozzle 65 using the first nozzle heater 91. Fluidity of the shaping material in the second nozzle 66 can be improved by heating the second nozzle 66 using the second nozzle heater 92.

Figure 3:
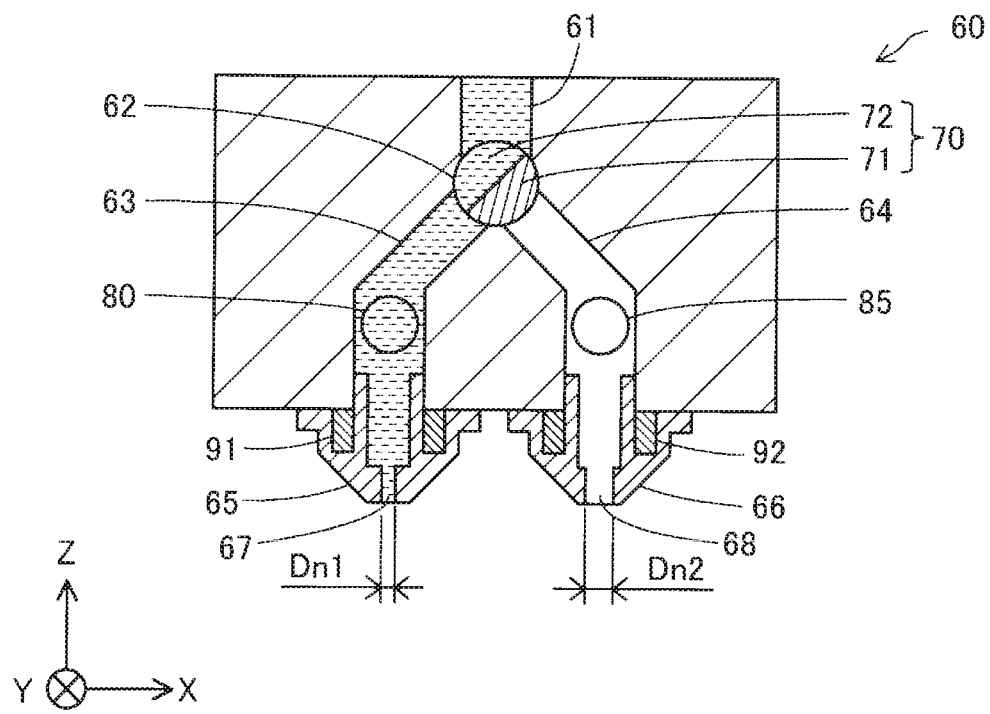
FIG. 3 is a sectional schematic view showing a schematic configuration of a valve mechanism in a first state.
Figure 4:
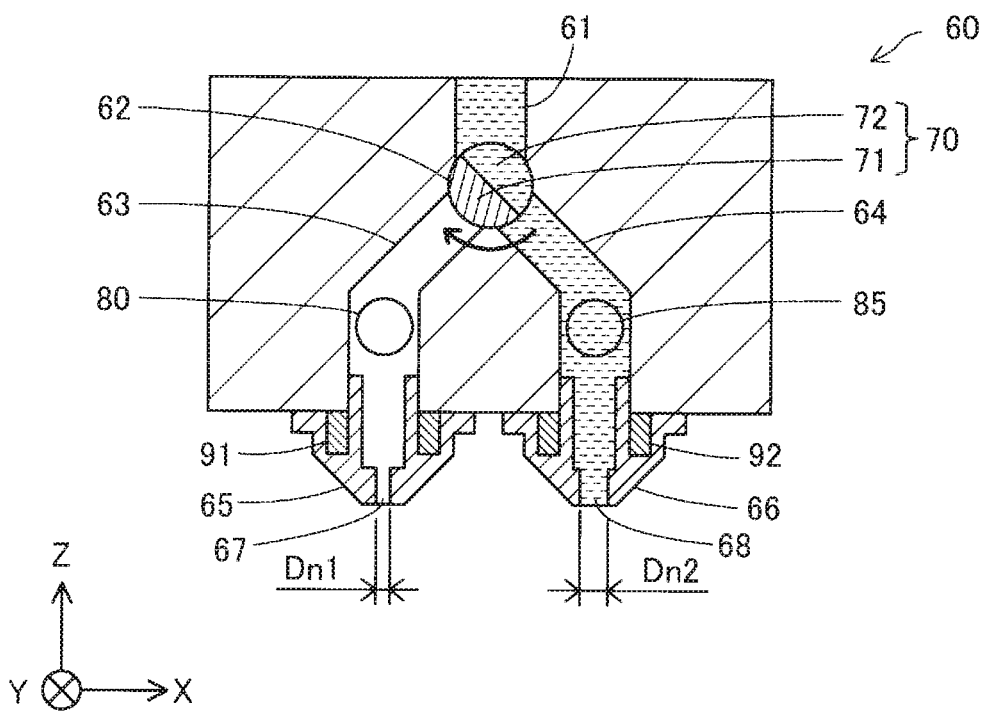
FIG. 4 is a sectional schematic view showing a schematic configuration of the valve mechanism in a second state.
Figure 5:
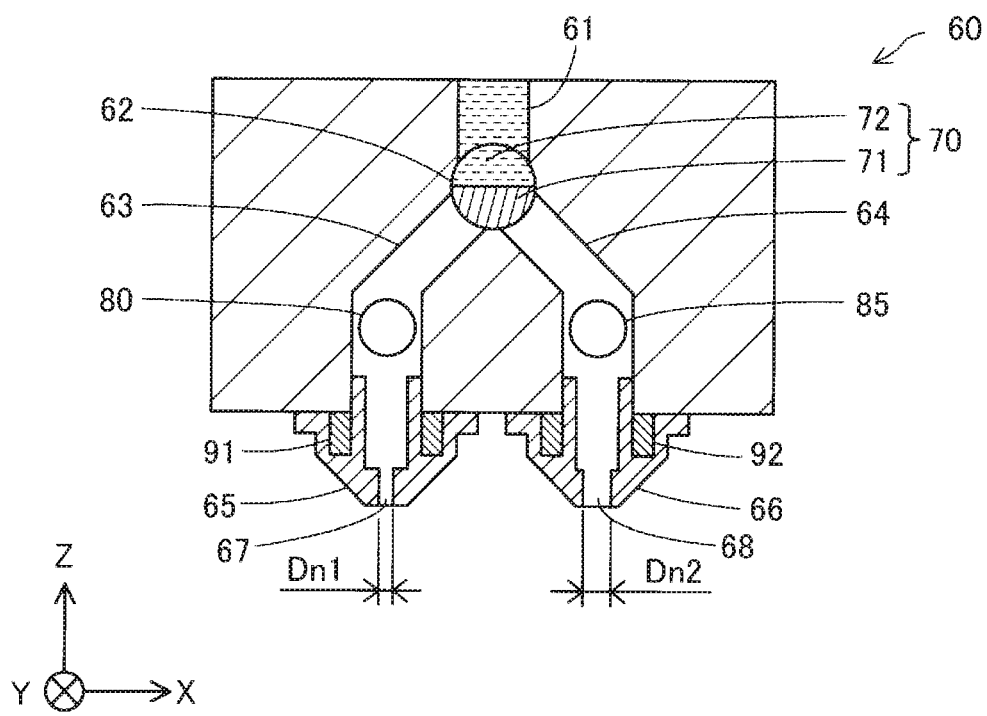
FIG. 5 is a sectional schematic view showing a schematic configuration of the valve mechanism in a third state.

FIG. 3 is a sectional schematic view showing a schematic configuration of the valve mechanism 70 in a first state. FIG. 4 is a sectional schematic view showing a schematic configuration of the valve mechanism 70 in a second state. FIG. 5 is a sectional schematic view showing a schematic configuration of the valve mechanism 70 in a third state. The first state means a state of the three-dimensional shaping apparatus 100 in which the supply channel 61 and the first branch channel 63 communicate and the supply channel 61 and the second branch channel 64 are cut off. The second state means a state of the three-dimensional shaping apparatus 100 in which the supply channel 61 and the second branch channel 64 communicate and the supply channel 61 and the first branch channel 63 are cut off. The third state means a state of the three-dimensional shaping apparatus 100 in which the supply channel 61 and the first branch channel 63 communicate and the supply channel 61 and the second branch channel 64 are cut off.

The valve mechanism 70 is a valve configured to be switchable to the first state, the second state, and the third state. The valve mechanism 70 includes a valve section 71 configured to be rotatable in the coupling section 62 and including a flow path 72 through which the shaping material can flow. According to the rotation of the valve section 71, one of the first branch channel 63 and the second branch channel 64 communicates with the supply channel 61 via the flow path 72 and the other is cut off from the supply channel 61 by the valve section 71, whereby the valve mechanism 70 is switched to the first state and the second state. The valve mechanism 70 in this embodiment is configured to be capable of adjusting a rotation angle of the valve section 71 to thereby be configured to be capable of adjusting a first flow rate of the shaping material flowing into the first branch channel 63 in the first state and a second flow rate of the shaping material flowing into the second branch channel 64 in the second state. Further, the valve mechanism 70 in this embodiment can also be switched to the third state by cutting off the supply channel 61 and the first branch channel 63 and cutting off the supply channel 61 and the second branch channel 64.

Figure 6:
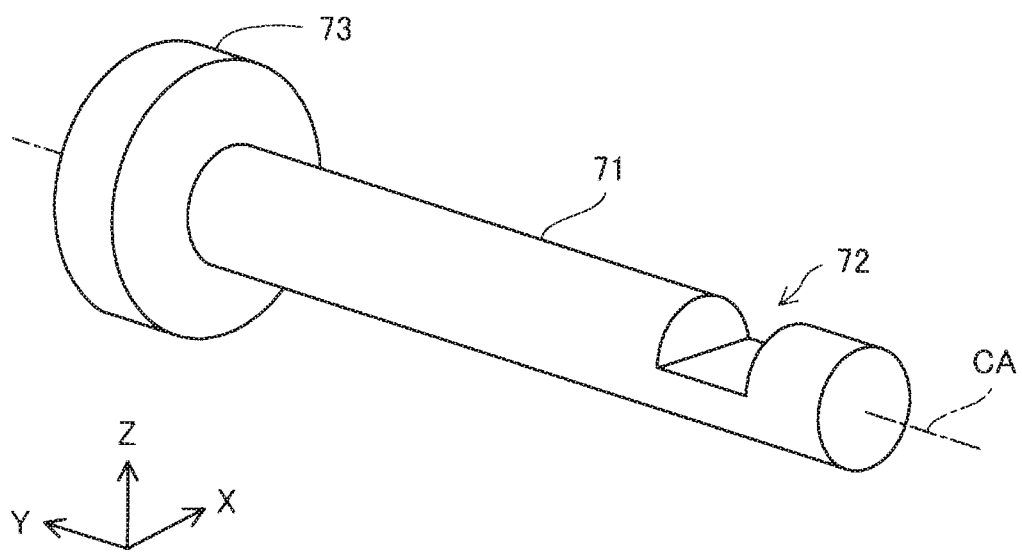
FIG. 6 is a perspective view showing a schematic configuration of a valve section in the first embodiment.

FIG. 6 is a perspective view showing the valve section 71 in this embodiment. The valve section 71 in this embodiment has a columnar shape having a center axis CA. The flow path 72 is provided with a part of the side surface of the valve section 71 cut out. An operation section 73 is provided at one end portion of the valve section 71. A motor driven under the control by the control section 700 is coupled to the operation section 73. Torque by the motor is applied to the operation section 73, whereby the valve section 71 rotates.

The ejecting section 60 in this embodiment includes the first suction section 80 coupled to the first branch channel 63 and the second suction section 85 coupled to the second branch channel 64. The first suction section is configured to be capable of sucking the shaping material in the first branch channel 63. The second suction section 85 is configured to be capable of sucking the shaping material in the second branch channel 64.

Figure 7:
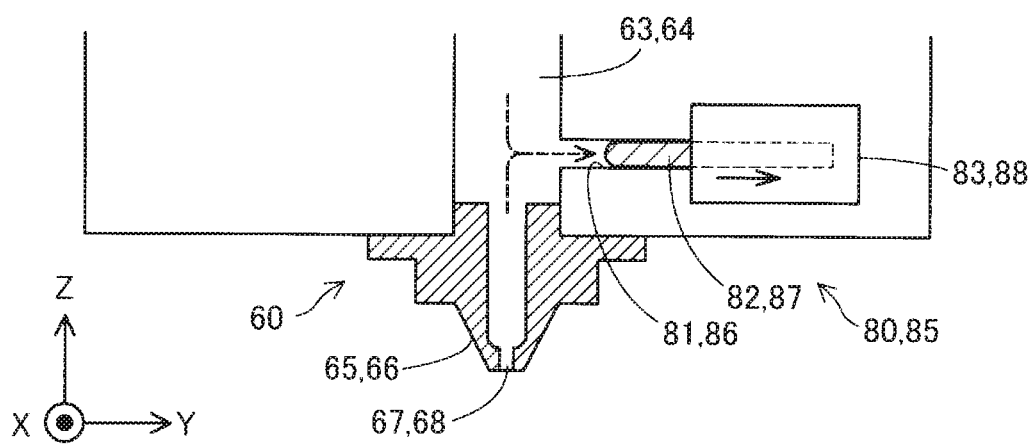
FIG. 7 is an explanatory diagram showing a schematic configuration of a suction section in the first embodiment.

FIG. 7 is an explanatory diagram showing a schematic configuration of the first suction section 80. In this embodiment, the first suction section 80 includes a cylindrical first cylinder 81 coupled to the first branch channel 63, a first plunger 82 housed in the first cylinder 81, and a first plunger driving section 83 that drives the first plunger 82. In this embodiment, the first plunger driving section 83 is configured by a motor driven under the control by the control section 700 and a rack and pinion that converts rotation of the motor into movement in a translational direction along the axial direction of the first cylinder 81. The first plunger driving section 83 may be configured by the motor driven under the control by the control section 700 and a ball screw that converts the rotation of the motor into the movement in the translational direction along the axial direction of the first cylinder 81 or may be configured by an actuator such as a solenoid mechanism or a piezoelectric element.

As indicated by using arrows in FIG. 7, when the first plunger 82 moves in a direction away from the first branch channel 63, since negative pressure is generated in the first cylinder 81, the shaping material in the first branch channel 63 to the first nozzle 65 is sucked into the first cylinder 81. On the other hand, when the first plunger 82 moves in a direction of approach to the first branch channel 63, the shaping material in the first cylinder 81 is extruded to the first branch channel 63 by the first plunger 82.

The second suction section 85 includes a cylindrical second cylinder 86 coupled to the second branch channel 64, a second plunger 87 housed in the second cylinder 86, and a second plunger driving section 88 that drives the second plunger 87. The configuration and the operation of the second suction section 85 are the same as the configuration and the operation of the first suction section 80. Therefore, explanation of the configuration and the operation is omitted.

Figure 8:
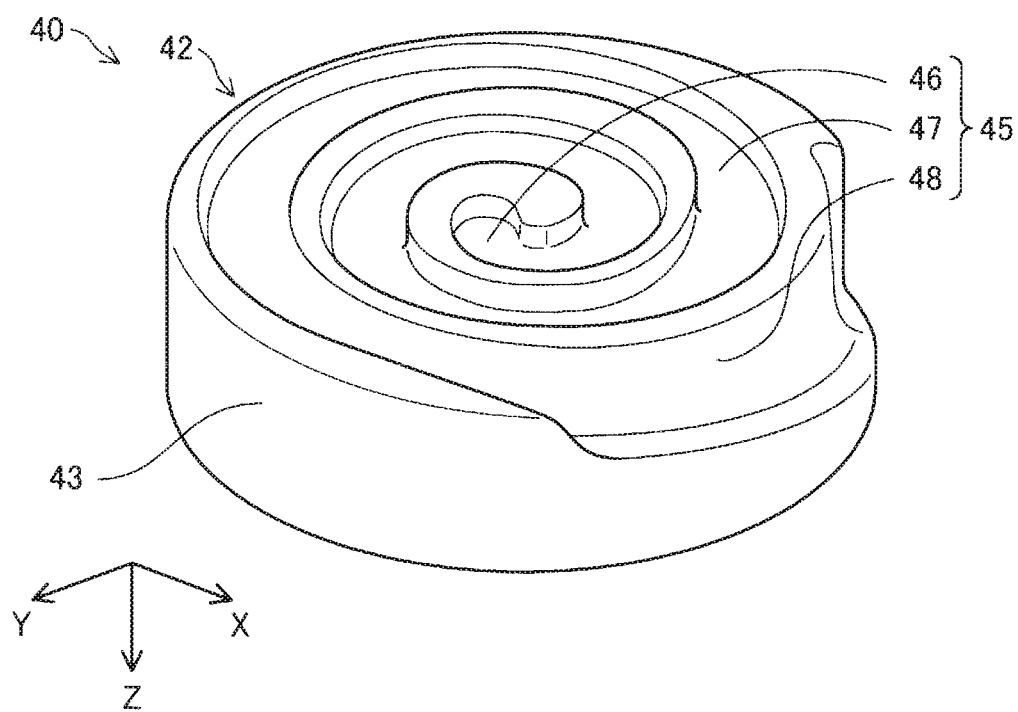
FIG. 8 is a perspective view showing the configuration of a groove forming surface of a flat screw in the first embodiment.

FIG. 8 is a perspective view showing the configuration of the groove forming surface 42 of the flat screw 40 in this embodiment. To facilitate understanding of the technique, the flat screw 40 shown in FIG. 8 is shown in a state in which a vertical positional relation shown in FIG. 2 is reversed. As explained above, the groove section 45 is formed on the groove forming surface 42 of the flat screw 40. The groove section 45 includes a center section 46, a swirl-like section 47, and a material introducing section 48.

The center section 46 is a circular hollow formed around the center axis AX of the flat screw 40. The center section 46 is opposed to the communication hole 56 provided in the barrel 50.

The swirl-like section 47 is a groove extending in a swirl shape to draw an arc toward the outer circumference of the groove forming surface 42 centering on the center section 46. The swirl-like section 47 may be configured to extend in an involute curve shape or a spiral shape. One end of the swirl-like section 47 is coupled to the center section 46. The other end of the swirl-like section 47 is coupled to the material introducing section 48.

The material introducing section 48 is a groove wider than the swirl-like section 47 provided at the outer circumferential edge of the screw counter surface 52. The material introducing section 48 continues to a side surface 43 of the flat screw 40. The material introducing section 48 introduces a material supplied from the material storage section 20 via the supply path 22 into the swirl-like section 47.

Figure 9:
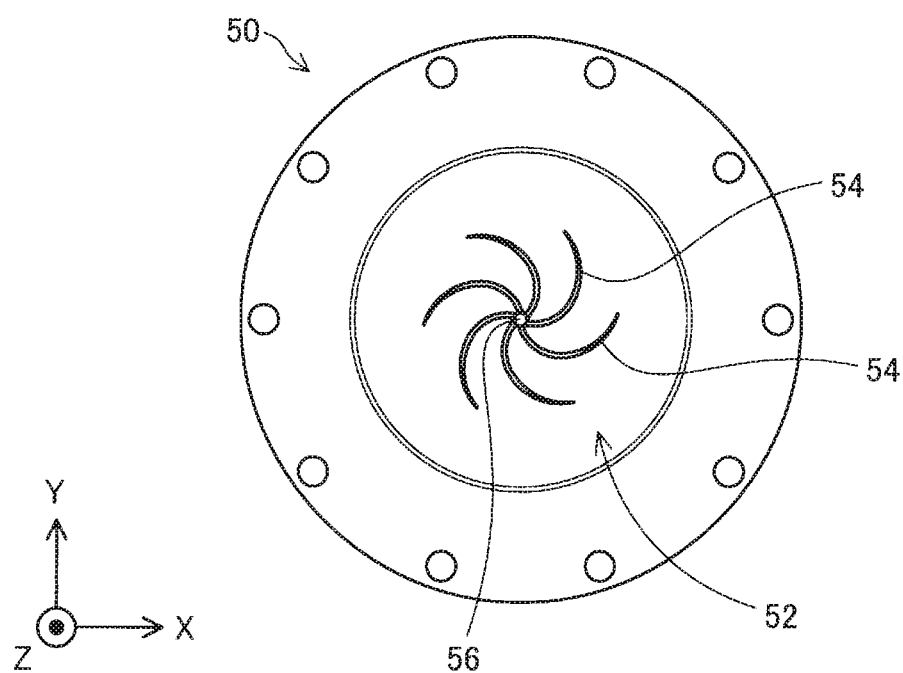
FIG. 9 is a top view showing the configuration of a screw counter surface of a barrel in the first embodiment.

FIG. 9 is a top view showing the configuration of the screw counter surface 52 of the barrel 50 in this embodiment. As explained above, the communication hole 56 communicating with the supply channel 61 is formed in the center of the screw counter surface 52. A plurality of guide grooves 54 are formed around the communication hole 56 on the screw counter surface 52. One ends of the guide grooves 54 are coupled to the communication hole 56. The guide grooves 54 extend in a swirl shape from the communication hole 56 toward the outer circumference of the screw counter surface 52. The guide grooves 54 have a function of guiding the shaping material to the communication hole 56.

With the configuration of the three-dimensional shaping apparatus 100 explained above, the material supplied from the material supplying mechanism 500 and stored in the material storage section 20 is supplied from the side surface 43 of the rotating flat screw 40 to the material introducing section 48 through the supply path 22. The material supplied to the material introducing section 48 is conveyed into the swirl-like section 47 by the rotation of the flat screw 40.

At least a part of the material conveyed into the swirl-like section 47 is melted by the rotation of the flat screw 40 and the heating by the heater 58 incorporated in the barrel 50 to be a paste-like shaping material having fluidity.

The shaping material is conveyed toward the center section 46 in the swirl-like section 47 by the rotation of the flat screw 40. The shaping material conveyed to the center section 46 is delivered from the communication hole 56 to the supply channel 61. In the first state, the shaping material is supplied from the supply channel 61 to the first nozzle 65 via the first branch channel 63. The shaping material supplied to the first nozzle 65 is ejected from the first nozzle hole 67 toward the shaping table 300. On the other hand, in the second state, the shaping material is supplied from the supply channel 61 to the second nozzle 66 via the second branch channel 64. The shaping material supplied to the second nozzle 66 is ejected from the second nozzle hole 68 toward the shaping table 300. In this way, the shaping material is stacked on the shaping table 300 to shape a three-dimensional shaped object.

Figure 10:
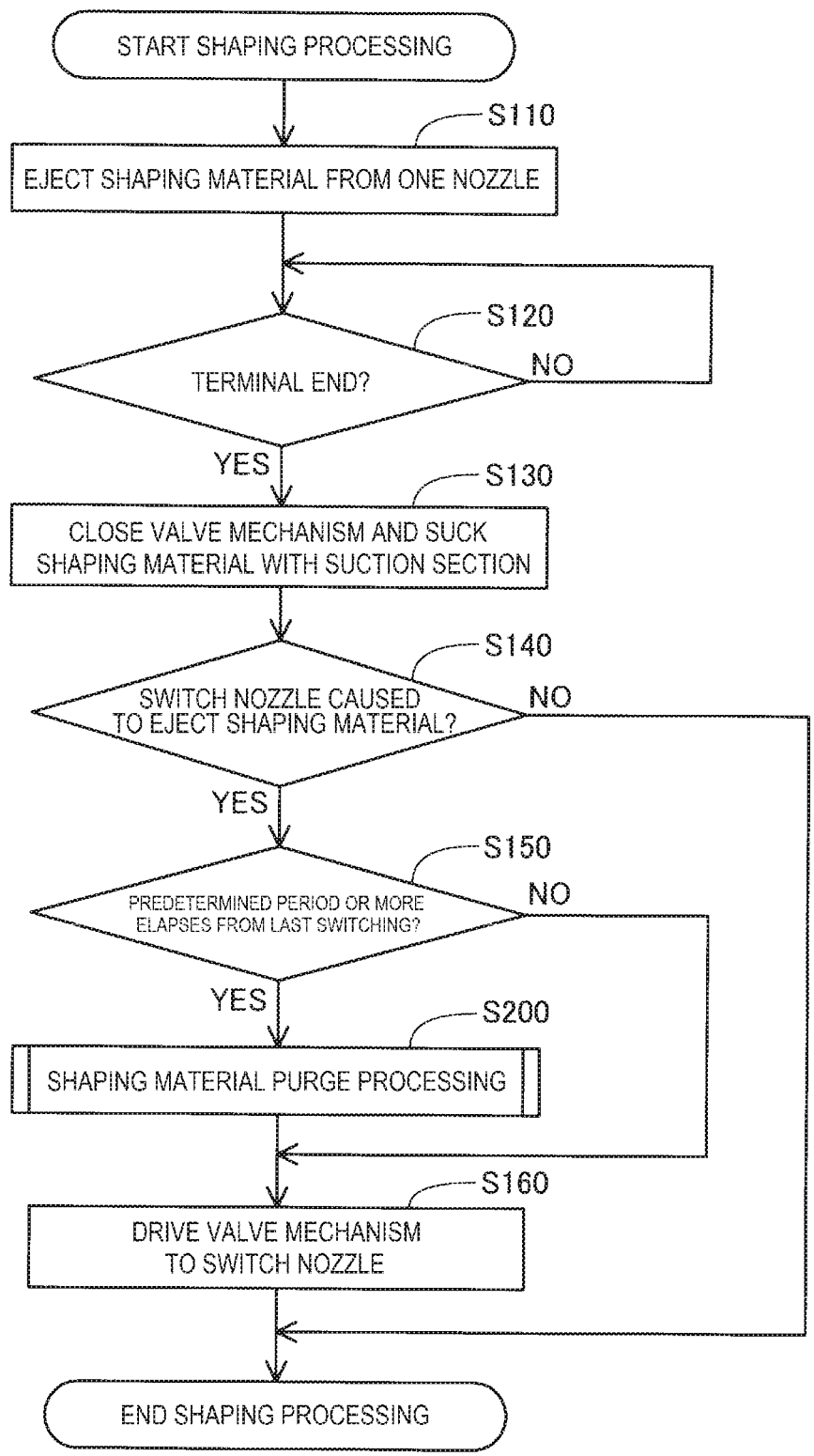
FIG. 10 is a flowchart showing content of shaping processing in the first embodiment.

FIG. 10 is a flowchart showing content of shaping processing for realizing shaping of a three-dimensional shaped object. This processing is executed when a user performs predetermined start operation on an operation panel provided in the three-dimensional shaping apparatus 100 or a computer coupled to the three-dimensional shaping apparatus 100.

First, in step S110, the control section 700 controls the melting section 30, the valve mechanism 70, the first moving mechanism 410, and the second moving mechanism 420 to thereby eject the shaping material from the first nozzle 65 or the second nozzle 66 and shape the three-dimensional shaped object in a shaping region of the shaping table 300. The shaping region is a region where the three-dimensional shaped object is shaped. The shaping region is set by shaping path data included in a G code for performing shaping of the three-dimensional shaped object.

In this embodiment, when an exterior shape of the three-dimensional shaped object is shaped, the control section 700 controls the valve mechanism 70 to be in the first state to thereby eject the shaping material from the small-diameter first nozzle 65. On the other hand, when an internal shape of the three-dimensional shaped object is shaped, the control section 700 controls the valve mechanism 70 to be in the second state to thereby eject the shaping material from the large-diameter second nozzle 66. The exterior shape means a part visually recognizable from the outside in a completed shape of the three-dimensional shaped object. A part of the three-dimensional shaped object other than the exterior shape is referred to as internal shape. The control section 700 can determine, for example, using the shaping path data, whether a part of the three-dimensional shaped object to be shaped is the exterior shape. Quality higher than the quality of the internal shape is requested for the external shape concerning dimension accuracy and surface roughness. Therefore, the exterior shape is desirably finely shaped by ejecting the shaping material from the small-diameter first nozzle 65. On the other hand, higher quality than the quality of the exterior shape is not requested for the internal shape concerning dimension accuracy and surface roughness. Therefore, the internal shape is desirably shaped in a short time by ejecting the shaping material from the large-diameter second nozzle 66.

Subsequently, in step S120, the control section 700 determines whether the shaping is at a terminal end of a continuous shaping path. The control section 700 can determine, using the shaping path data, whether the shaping is at the terminal end of the continuous shaping path. When not determining in step S120 that the shaping is at the terminal end of the continuous shaping path, the control section 700 continues the shaping of the three-dimensional shaped object while repeating the processing in step S120.

On the other hand, when determining in step S120 that the shaping is at the terminal end of the continuous shaping path, in step S130, the control section 700 controls the valve mechanism 70 to thereby stop the ejection of the shaping material. When the shaping material is ejected from the first nozzle 65, first, the control section 700 controls the valve mechanism 70 to thereby cut off the supply channel 61 and the first branch channel 63. Thereafter, the control section 700 controls the first suction section 80 to thereby suck the shaping material remaining in the first branch channel 63 and the first nozzle 65 into the first cylinder 81 to stop the ejection of the shaping material from the first nozzle 65. When the shaping material is ejected from the second nozzle 66, first, the control section 700 controls the valve mechanism 70 to thereby cut off the supply channel 61 and the second branch channel 64. Thereafter, the control section 700 controls the second suction section 85 to thereby suck the shaping material remaining in the second branch channel 64 and the second nozzle 66 into the second cylinder 86 to stop the ejection of the shaping material from the second nozzle 66.

After the ejection of the shaping material from the first nozzle 65 and the second nozzle 66 is stopped, in step S140, the control section 700 determines whether to switch a nozzle caused to eject the shaping material. The control section 700 can determine, using the shaping path data, whether to switch the nozzle caused to eject the shaping material. For example, when a shaping path in which the immediately preceding shaping is performed is included in the internal shape and a shaping path in which the next shaping is performed is included in the exterior shape, the control section 700 determines to switch the nozzle caused to eject the shaping material. When the shaping path in which the immediately preceding shaping is performed is included in the exterior shape and the shaping path in which the next shaping is performed is included in the internal shape, the control section 700 determines to switch the nozzle caused to eject the shaping material.

When not determining in step S140 to switch the nozzle caused to eject the shaping material, the control section 700 ends the shaping processing in this shaping path and resumes the shaping processing from step S110 in order to perform shaping in the next shaping path.

On the other hand, when determining in step S140 to switch the nozzle caused to eject the shaping material, in step S150, the control section 700 determines whether a predetermined period or more have elapsed after the switching of the nozzle is performed last time.

The predetermined period can be set according to speed of progress of denaturation of the shaping material. For example, the period in which the ejection of the shaping material from the first nozzle 65 is stopped and then resumed can be set by checking, with a test performed in advance, a period until quality deterioration of the three-dimensional shaped object is caused by denaturation of the shaping material remaining in the first nozzle 65. The period in which the ejection of the shaping material from the second nozzle 66 is stopped and then resumed can be set by checking, with a test performed in advance, a period until quality deterioration of the three-dimensional shaped object is caused by denaturation of the shaping material remaining in the second nozzle 66. The period is set to a period within a range in which quality deterioration of the three-dimensional shaped object does not occur. The period may be different between when the first nozzle 65 is switched to the second nozzle 66 and when the second nozzle 66 is switched to the first nozzle 65. When thermoplastic resin is included in the material, the period may be set according to a glass transition point of the thermoplastic resin. In this case, the period is set shorter as the glass transition point of the thermoplastic resin is lower. That is, when a glass transition point of second thermoplastic resin is lower than a glass transition point of first thermoplastic resin, the period in which the second thermoplastic resin is included in the material is set shorter than the period in which the first thermoplastic resin is included in the material. In this embodiment, since ABS resin, which is the thermoplastic resin, is used as the material, a period corresponding to a glass transition point of the ABS resin is set as the period. The period can be set according to a type of the material. When a plurality of kinds of thermoplastic resin are included in the material, the period may be set using a glass transition point of thermoplastic resin having the largest physical quantity among the plurality of kinds of thermoplastic resin. Different periods may be set when the first nozzle 65 is switched to the second nozzle 66 and when the second nozzle 66 is switched to the first nozzle 65. The period in which the ejection of the shaping material from the first nozzle 65 is stopped and then resumed is sometimes referred to as first standby period. The period in which the ejection of the shaping material from the second nozzle 66 is stopped and then resumed is sometimes referred to as second standby period.

When not determining in step S150 that the predetermined period or more have elapsed after the switching of the nozzle is performed last time, in step S160, the control section 700 controls the valve mechanism 70 to thereby switch the nozzle caused to eject the shaping material. Thereafter, the control section 700 ends the shaping processing in this shaping path and resumes the shaping processing from step S110 using the nozzle after the switching in order to perform shaping in the next shaping path.

On the other hand, when determining in step S150 that the predetermined period or more have elapsed after the switching of the nozzle is performed last time, in step S200, the control section 700 executes shaping material purge processing. Thereafter, in step S160, the control section 700 controls the valve mechanism 70 to thereby switch the nozzle caused to eject the shaping material. Thereafter, the control section 700 ends the shaping processing in this shaping path and resumes the shaping processing from step S110 using the nozzle after the switching in order to perform shaping in the next shaping path. The control section 700 repeats this processing until the shaping of the three-dimensional shaped object is completed.

Figure 11:
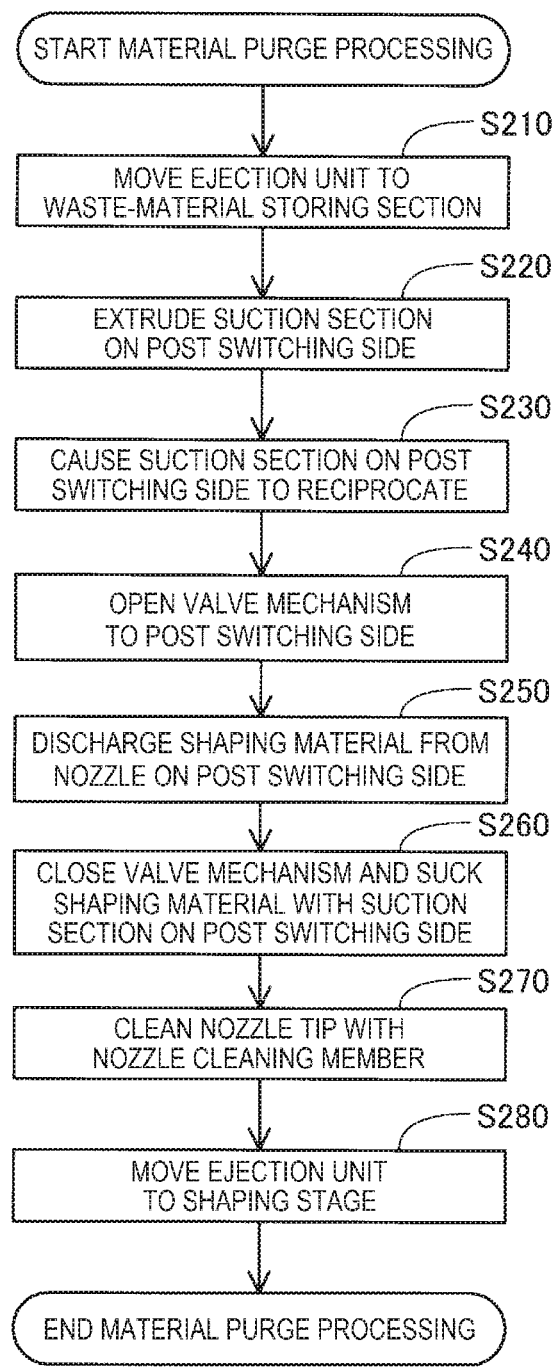
FIG. 11 is a flowchart showing content of material purge processing in the first embodiment.

FIG. 11 is a flowchart showing content of material purge processing in this embodiment. Content of processing performed when the nozzle caused to eject the shaping material is switched from the first nozzle 65 to the second nozzle 66, in other words, when the first state is switched to the second state is explained with reference to FIG. 11. Concerning the content of the processing performed when the nozzle caused to eject the shaping material is switched from the second nozzle 66 to the first nozzle 65, in other words, when the second state is switched to the first state, the first nozzle 65 is read as the second nozzle 66 and the second nozzle 66 is read as the first nozzle 65 in the explanation with reference to FIG. 11. The material purge processing performed when the second state is switched to the first state is sometimes referred to as first material purge processing. The material purge processing performed when the first state is switched to the second state is sometimes referred to as second material purge processing.

First, in step S210, the control section 700 controls the first moving mechanism 410 to thereby move the ejection unit 200 to above the waste-material storing section 600.

Subsequently, in step S220, the control section 700 controls the second suction section 85 to thereby move the second plunger 87 in a direction of approach to the second branch channel 64. The second plunger 87 moves in the direction of approach to the second branch channel 64, the shaping material remaining in the second cylinder 86 is extracted to the second branch channel 64.

Thereafter, in step S230, the control section 700 controls the second suction section 85 to thereby cause the second plunger 87 to reciprocate in the second cylinder 86. In this embodiment, the second plunger 87 reciprocates in the second cylinder 86 at 50 Hz. The second plunger 87 moves in a direction away from the second branch channel 64, whereby air is sucked into the second cylinder 86 from the second nozzle 66. The second plunger 87 moves in the direction of approach to the second branch channel 64, whereby the air sucked into the second cylinder 86 is extruded to the second branch channel 64. The control section 700 controls the second suction section 85 to thereby cause the second suction section 85 to repeat this operation for a predetermined time. For example, the control section 700 causes the second suction section 85 to repeat this operation for three seconds. A part of the shaping material remaining in the second branch channel 64 and the second nozzle 66 is discharged from the second nozzle 66 by the air extruded from the inside of the second cylinder 86 to the second branch channel 64. The control section 700 stops the second plunger 87 in a state in which the second plunger 87 has moved in the direction of approach to the second branch channel 64. Therefore, the shaping material is suppressed from remaining in the second cylinder 86.

In step S240, the control section 700 controls the valve mechanism 70 to thereby cause the supply channel 61 and the second branch channel 64 to communicate. The supply channel 61 and the second branch channel 64 communicate, whereby a new shaping material is supplied from the supply channel 61 to the second branch channel 64.

After the new shaping material is supplied from the supply channel 61 to the second branch channel 64, in step S250, the control section 700 discharges the shaping material remaining in the second branch channel 64 and the second nozzle 66 from the second nozzle 66 toward the waste-material storing section 600, which is a region different from the shaping region. The shaping material remaining in the second branch channel 64 and the second nozzle 66 is extruded by the shaping material supplied from the supply channel 61 anew to thereby be discharged from the second nozzle 66 to the waste-material storing section 600. Therefore, the shaping material remaining in the second branch channel 64 and the second nozzle 66 is replaced with the shaping material supplied from the supply channel 61 anew. At this time, the control section 700 desirably discharges, from the second nozzle 66, the shaping material equal to or more than a capacity obtained by adding up the capacity of the second branch channel 64 and the capacity of the second nozzle 66 such that the shaping material remaining in the second branch channel 64 and the second nozzle 66 is surely replaced with the shaping material supplied from the supply channel 61 anew. The discharged shaping material is stored in the waste-material storing section 600.

After the shaping material remaining in the second branch channel 64 and the second nozzle 66 is discharged to the waste-material storing section 600, in step S260, the control section 700 controls the valve mechanism 70 to thereby cut off the supply channel 61 and the second branch channel 64 and stop the ejection of the shaping material from the second nozzle 66. Further, the control section 700 controls the second suction section 85 to thereby suck the shaping material in the second branch channel 64 and the second nozzle 66 into the second cylinder 86 of the second suction section 85. Therefore, the shaping material is suppressed from leaking from the second nozzle 66 while the ejection unit 200 moves from above the waste-material storing section 600 to above the shaping table 300.

After the ejection of the shaping material from the second nozzle 66 is stopped, in step S270, the control section 700 controls the first moving mechanism 410 to thereby rub the tip portion of the second nozzle 66 against the nozzle cleaning member 610 and remove the shaping material adhering to the tip portion of the second nozzle 66.

In step S280, the control section 700 controls the first moving mechanism 410 to thereby move the ejection unit 200 to above the shaping table 300. Thereafter, the control section 700 ends this processing and resumes the shaping processing from step S160.

With the three-dimensional shaping apparatus 100 in this embodiment explained above, when switching the first state to the second state, prior to the ejection of the shaping material to the shaping region by the second nozzle 66, the control section 700 supplies the new shaping material from the supply channel 61 to the second branch channel 64 to thereby discharge the shaping material remaining in the second branch channel 64 and the second nozzle 66 to the waste-material storing section 600. When switching the second state to the first state, prior to the ejection of the shaping material to the shaping region by the first nozzle 65, the control section 700 supplies the new shaping material from the supply channel 61 to the first branch channel 63 to thereby discharge the shaping material remaining in the first branch channel 63 and the first nozzle 65 to the waste-material storing section 600. Therefore, it is possible to suppress deterioration in the quality of the three-dimensional shaped object by a denatured old shaping material.

In this embodiment, the control section 700 discharges a remaining old shaping material earlier as a glass transition point of thermoplastic resin included in the material is lower. That is, the control section 700 discharges a remaining shaping material earlier as heat resistance of the shaping material is lower. Therefore, it is possible to more surely suppress deterioration in the quality of the three-dimensional shaped object.

In this embodiment, prior to the supply of the new shaping material from the supply channel 61 to the second branch channel 64, the control section 700 causes the second plunger 87 to reciprocate in the second cylinder 86 to thereby extrude, with the air, an old shaping material remaining in the second branch channel 64 and the second nozzle 66 and discharges the old shaping material to the waste-material storing section 600. Prior to the supply of the new shaping material from the supply channel 61 to the first branch channel 63, the control section 700 causes the first plunger 82 to reciprocate in the first cylinder 81 to thereby extrude, with the air, an old shaping material remaining in the first branch channel 63 and the first nozzle 65 and discharges the old shaping material to the waste-material storing section 600. Therefore, the old shaping material remaining in the first branch channel 63 and the first nozzle 65 and the old shaping material remaining in the second branch channel 64 and the second nozzle 66 are more surely discharged. Clogging of the first nozzle 65 and the second nozzle 66 can be suppressed.

In this embodiment, the shaping material adhering to the tip portion of the first nozzle 65 and the tip portion of the second nozzle 66 can be removed by the nozzle cleaning member 610. Therefore, it is possible to further suppress occurrence of clogging of the first nozzle 65 and the second nozzle 66 and deterioration in the quality of the three-dimensional shaped object.

In this embodiment, the material of the pellet-like ABS resin is used. However, as the material used in the ejection unit 200, for example, a material for shaping a three-dimensional shaped object using, as a main material, various materials such as a material having thermoplasticity, a metal material, and a ceramic material can be adopted. The "main material" means a material functioning as a central material forming the shape of the three-dimensional shaped object and means a material having a content equal to or larger than 50 weight % in the three-dimensional shaped object. The shaping material explained above includes a shaping material obtained by melting the main material alone and a shaping material obtained by melting a part of components contained together with the main material and forming the part of the components in a paste state.

When the material having thermoplasticity is used as the main material, the shaping material is generated by plasticizing the material in the melting section 30. "Plasticizing" means that heat is applied to the material having thermoplasticity and the material melts.

As the material having thermoplasticity, for example, one of the following materials or a thermoplastic resin material obtained by combining two or more of the following materials can be used.

Examples of the Thermoplastic Resin Material

General-purpose engineering plastic such as polypropylene resin (PP), polyethylene resin (PE), polyacetal resin (POM), polyvinylchloride resin (PVC), polyamide resin (PA), acrylonitrile butadiene styrene resin (ABS), polylactic resin (PLA), polyphenylene sulfide resin (PPS), polyether ether ketone (PEEK), polycarbonate (PC), denaturated-polyphenyleneether, polybutylene terephthalate, and polyethylene terephthalate and engineering plastic such as polysulphone, polyether sulphone, polyphenylene sulfide, polyarylate, polyimide, polyamide-imide, polyether imide, and polyether ether ketone A pigment, metal, ceramic, and an additive such as wax, a flame retardant, an antioxidant, or a heat stabilizer may be mixed in the material having thermoplasticity. The material having thermoplasticity is converted into a state in which the material is plasticized and melted by the rotation of the flat screw 40 and the heating of the heater 58 in the melting section 30. The shaping material generated in that way is ejected from the first nozzle hole 67 or the second nozzle hole 68 and thereafter hardened by a drop of temperature.

The material having thermoplasticity is desirably ejected from the first nozzle hole 67 and the second nozzle hole 68 in a state in which the material is heated to temperature equal to or higher than a glass transition point of the material and is completely melted. For example, the ABS resin has a glass transition point of approximately 120° C. and desirably has approximately 200° C. during the ejection from the first nozzle hole 67 and the second nozzle hole 68. In order to eject the shaping material in a high-temperature state in this way, a heater may be provided around the first nozzle hole 67 and the second nozzle hole 68.

In the ejection unit 200, for example, any one of the following metal materials may be used as the main material instead of the material having thermoplasticity. In this case, it is desirable that components to be melted in generation of the shaping material are mixed in a powder material obtained by powdering the metal material and the powder material is put in the melting section 30.

Examples of the Metal Materials

Single metal such as magnesium (Mg), iron (Fe), cobalt (Co), chrome (Cr), aluminum (Al), titanium (Ti), copper (Cu), and nickel (Ni) or alloys containing one or more of these kinds of metal Examples of the Alloys Maraging steel, stainless steel, cobalt chrome molybdenum, a titanium alloy, a nickel alloy, an aluminum alloy, a cobalt alloy, and a cobalt chrome alloy In the ejection unit 200, a ceramic material can be used as the main material instead of the metal material. As the ceramic material, for example, oxide ceramics such as silicon dioxide, titanium dioxide, aluminum oxide, and zirconium oxide and non-oxide ceramics such as aluminum nitride can be used. When the metal material or the ceramic material described above is used as the main material, the shaping material disposed on the shaping table 300 may be hardened by sintering by, for example, irradiation of a laser or warm wind.

The powder material of the metal material or the ceramic material put in the material storage section 20 may be a mixed material obtained by mixing a plurality of kinds of powder of single metal, powder of alloys, or powder of ceramic materials. The powder material of the metal material or the ceramic material may be coated by, for example, the thermoplastic resin illustrated above or other kinds of thermoplastic resin. In this case, in the melting section 30, the thermoplastic resin may be melted to develop fluidity.

For example, the following solvents can be added to the powder material of the metal material or the ceramic material put in the material storage section 20. As the solvents, one kind selected out of the following can be used or two or more kinds selected out of the following can be used in combination.

Examples of the Solvent

Water; (poly) alkylene glycol monoalkyl ethers such as ethylene glycol monomethyl ether, ethylene glycol monoethyl ether, propylene glycol monomethyl ether, and propylene glycol monoethyl ether; acetic ethers such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetyl acetone; alcohols such as ethanol, propanol, and butanol; tetraalkyl ammonium acetates; sulfoxide-based solvents such as dimethyl sulfoxide and diester sulfoxide; pyridine-based solvents such as pyridine, γ-picoline, and 2,6-lutidine; tetraalkyl ammonium acetate (for example, tetrabutyl ammonium acetate); and ion liquid such as butyl carbitol acetate Besides, for example, the following binders can be added to the powder material of the metal material or the ceramic material put in the material storage section 20.

Examples of the Binder

Figure 12:
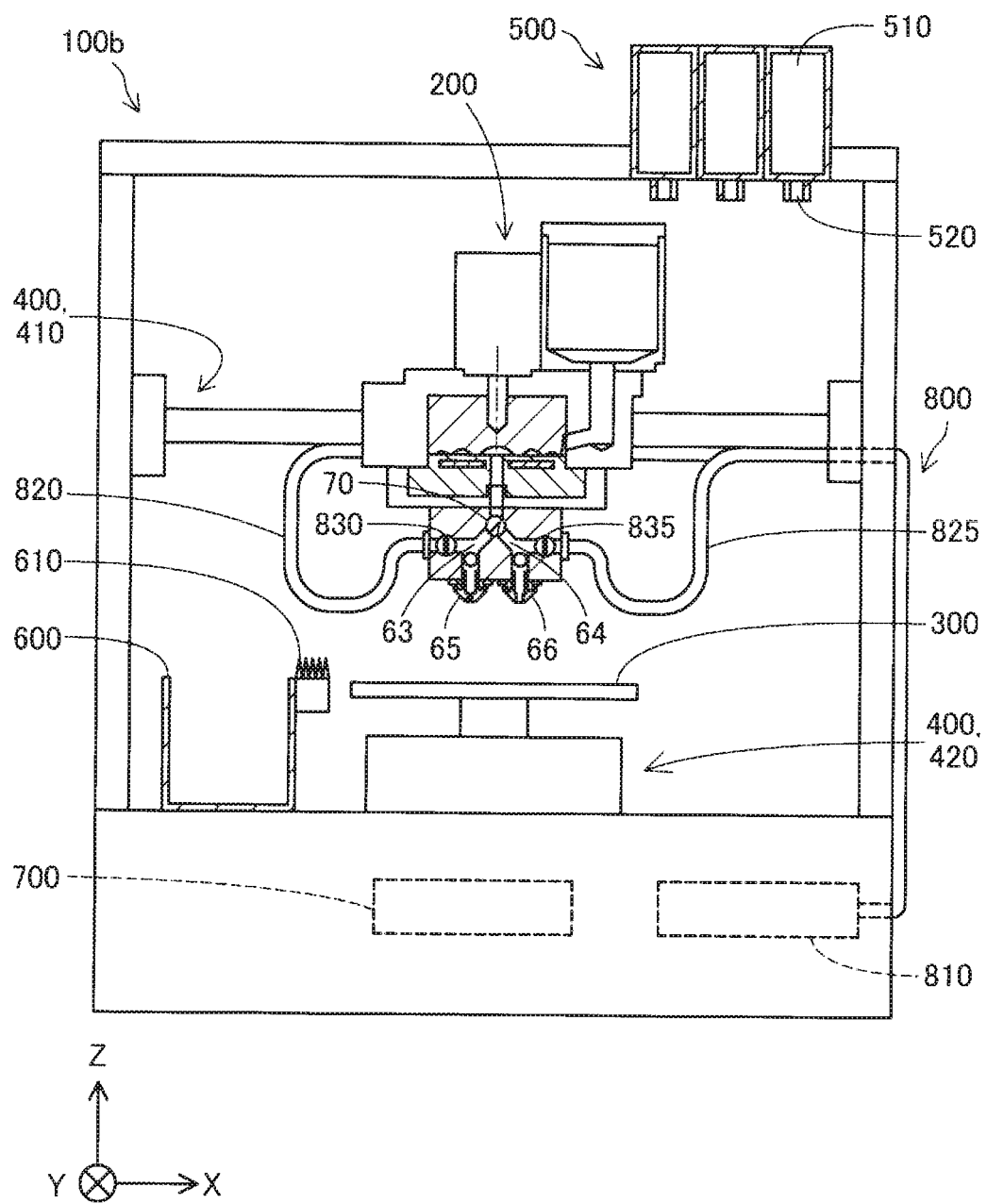
FIG. 12 is an explanatory diagram showing a schematic configuration of a three-dimensional shaping apparatus in a second embodiment.

Acrylic resin, epoxy resin, silicone resin, cellulose-based resin, or other kinds of synthetic resin or PLA (polylactic acid), PA (polyamide), PPS (polyphenylene sulfide), PEEK (polyether ether ketone), or other kinds of thermoplastic resin B. Second Embodiment FIG. 12 is an explanatory diagram showing a schematic configuration of a three-dimensional shaping apparatus 100b in a second embodiment. The three-dimensional shaping apparatus 100b in the second embodiment is different from the three-dimensional shaping apparatus 100 in the first embodiment in that the three-dimensional shaping apparatus 100b includes an air supplying mechanism 800. In the three-dimensional shaping apparatus 100b in the second embodiment, content of material purge processing is different from the content of the material purge processing in the first embodiment. The other components are the same as the components in the first embodiment shown in FIG. 1 unless specifically explained otherwise.

The air supplying mechanism 800 includes a compressor 810, a first air supply channel 820, a second air supply channel 825, a first on-off valve 830, and a second on-off valve 835. The compressor 810 compresses air into compressed air.

The first air supply channel 820 couples the compressor 810 and the valve mechanism 70 and the first suction section 80 in the first branch channel 63. The first on-off valve 830 is provided near a coupling section to the first branch channel 63 in the first air supply channel 820. The first on-off valve 830 is opened and closed by a motor driven under the control by the control section 700 and switches a communication state and a non-communication state of the compressor 810 and the first branch channel 63.

The second air supply channel 825 couples the compressor 810 and the valve mechanism 70 and the second suction section 85 in the second branch channel 64. The second on-off valve 835 is provided near a coupling section to the second branch channel 64 in the second air supply channel 825. The second on-off valve 835 is opened and closed by a motor driven under the control by the control section 700 and switches a communication state and a non-communication state of the compressor 810 and the second branch channel 64.

Figure 13:
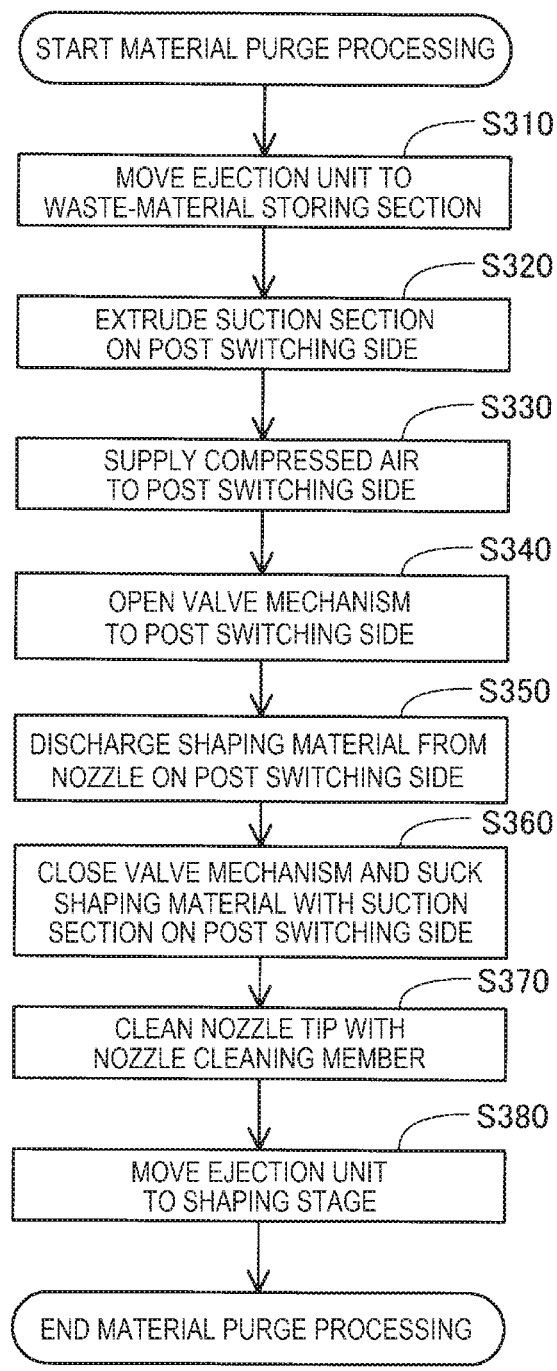
FIG. 13 is a flowchart showing content of material purge processing in the second embodiment.

FIG. 13 is a flowchart showing content of material purge processing in the second embodiment. Content of processing in steps S310 to S320 and steps S340 to S380 is the same as the content of the processing in steps S210 to S220 and steps S240 to S280 of the material purge processing in the first embodiment shown in FIG. 11. Therefore, explanation of the content of the processing is omitted.

In step S330, the control section 700 controls the air supplying mechanism 800 to thereby supply compressed air to between the valve mechanism 70 and the second suction section 85 in the second branch channel 64. The shaping material remaining in the second branch channel 64 and the second nozzle 66 is extruded by the supplied compressed air to thereby be discharged from the second nozzle 66 to the waste-material storing section 600.

With the three-dimensional shaping apparatus 100b in this embodiment explained above, prior to supplying a new shaping material from the supply channel 61 to the second branch channel 64, the control section 700 drives the air supplying mechanism 800 to thereby extrude, with the compressed air, an old shaping material remaining in the second branch channel 64 and the second nozzle 66 and discharges the old shaping material to the waste-material storing section 600. Prior to supplying a new shaping material from the supply channel 61 to the first branch channel 63, the control section 700 drives the air supplying mechanism 800 to extrude, with the compressed air, an old shaping material remaining in the first branch channel 63 and the first nozzle 65 and discharges the old shaping material to the waste-material storing section 600. Therefore, the old shaping material remaining in the first branch channel 63 and the first nozzle 65 and the old shaping material remaining in the second branch channel 64 and the second nozzle 66 are more surely discharged. Therefore, it is possible to further suppress deterioration in the quality of a three-dimensional object and suppress clogging of the first nozzle 65 and the second nozzle 66.

C. Third Embodiment

Figure 14:
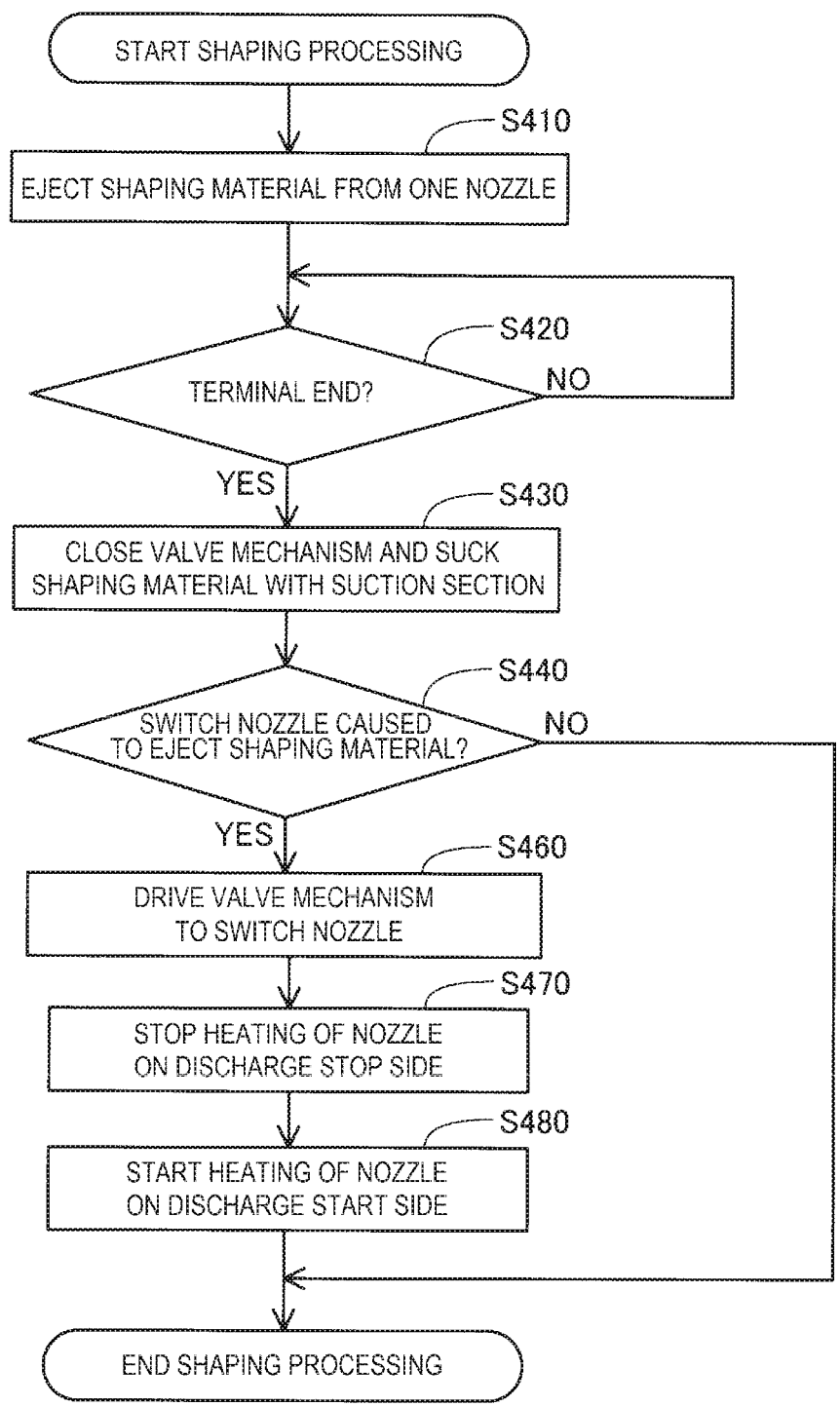
FIG. 14 is a flowchart showing content of shaping processing in a third embodiment.

FIG. 14 is a flowchart showing content of shaping processing in the third embodiment. The three-dimensional shaping apparatus 100 in the third embodiment is different from the three-dimensional shaping apparatus 100 in the first embodiment in that, when switching a nozzle caused to eject a shaping material to a shaping region, three-dimensional shaping apparatus 100 in the third embodiment switches ON and OFF of heating of the first nozzle 65 and the second nozzle 66 rather than executing the material purge processing. The other components are the same as the components in the first embodiment unless specifically explained otherwise.

Content of steps S410 to S430 in the shaping processing in this embodiment is the same as the content of steps S110 to S130 in the first embodiment explained with reference to FIG. 10. Therefore, explanation of the content of the steps is omitted. In step S440, the control section 700 determines whether to switch a nozzle caused to eject the shaping material. When not determining in step S440 to switch the nozzle caused to eject the shaping material, the control section 700 ends the shaping processing in this shaping path and resumes the shaping processing from step S410 in order to perform shaping in the next shaping path.

On the other hand, when determining in step S440 to switch the nozzle caused to eject the shaping material, the control section 700 controls the valve mechanism 70 to thereby switch the nozzle caused to eject the shaping material and switch ON and OFF of the heating of the first nozzle 65 and the second nozzle 66. Specifically, when the first nozzle 65 is switched to the second nozzle 66 in step S460, in step S470, the control section 700 controls the first nozzle heater 91 to thereby stop the heating of the first nozzle 65 that stops the ejection. In step S480, the control section 700 controls the second nozzle heater 92 to thereby start heating of the second nozzle 66 that resumes the ejection. When the second nozzle 66 is switched to the first nozzle 65 in step S460, in step S470, the control section 700 controls the second nozzle heater 92 to thereby stop the heating of the second nozzle 66 that stops the ejection. In step S480, the control section 700 controls the first nozzle heater 91 to thereby start the heating of the first nozzle 65 that resumes the ejection. Thereafter, the control section 700 ends the shaping processing in this shaping path and resumes the shaping processing from step S410 in order to perform shaping in the next shaping path. The control section 700 may perform steps S460 to S480 in any order. The control section 700 may simultaneously perform steps S460 to S480.

With the three-dimensional shaping apparatus 100 in this embodiment explained above, when the first nozzle 65 is switched to the second nozzle 66, the heating of the first nozzle 65 by the first nozzle heater 91 is stopped. When the second nozzle 66 is switched to the first nozzle 65, the heating of the second nozzle 66 by the second nozzle heater 92 is stopped. Therefore, it is possible to suppress the shaping material remaining in the nozzle in which the ejection is stopped from being denatured by heat.

D. Fourth Embodiment

Figure 15:
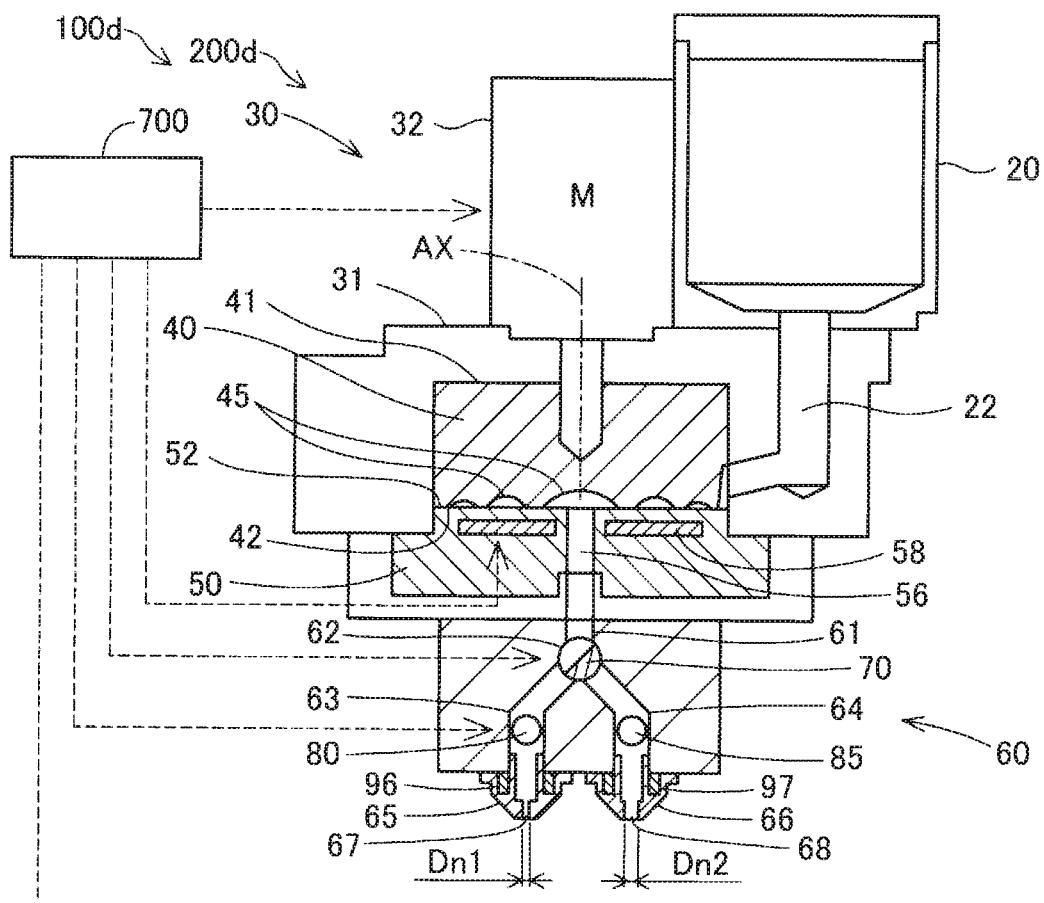
FIG. 15 is an explanatory diagram showing a schematic configuration of an ejection unit in a fourth embodiment.

FIG. 15 is an explanatory diagram showing a schematic configuration of an ejection unit 200d in a fourth embodiment. A three-dimensional shaping apparatus 100d in the fourth embodiment is different from the three-dimensional shaping apparatus 100 in the first embodiment in that the ejection unit 200d does not include the first nozzle heater 91 and the second nozzle heater 92 and includes a first nozzle cooling mechanism 96 and a second nozzle cooling mechanism 97. The three-dimensional shaping apparatus 100d in the fourth embodiment is different from the three-dimensional shaping apparatus 100 in the first embodiment in that, when a nozzle caused to eject a shaping material to a shaping region is switched, the three-dimensional shaping apparatus 100d does not execute the material purge processing and switches ON and OFF of cooling of the first nozzle 65 and the second nozzle 66. The other components are the same as the components in the first embodiment unless particularly explained otherwise.

In this embodiment, the first nozzle cooling mechanism 96 is configured by a coolant supply pipe for supplying coolant provided around the first nozzle 65 and a pump for circulating the coolant in the coolant supply pipe. The second nozzle cooling mechanism 97 is configured by a coolant supply pipe for supplying coolant provided around the second nozzle 66 and a pump for circulating the coolant in the coolant supply pipe. The first nozzle cooling mechanism 96 and the second nozzle cooling mechanism 97 may include a common pump. The coolant supply pipe coupled to one pump may be divided by a three-way valve into a coolant supply pipe for supplying the coolant to the first nozzle 65 side and a coolant supply pipe for supplying the coolant to the second nozzle 66 side. The first nozzle cooling mechanism 96 and the second nozzle cooling mechanism 97 may be configured by Peltier elements and power supplies that supply electric currents to the Peltier elements.

Figure 16:
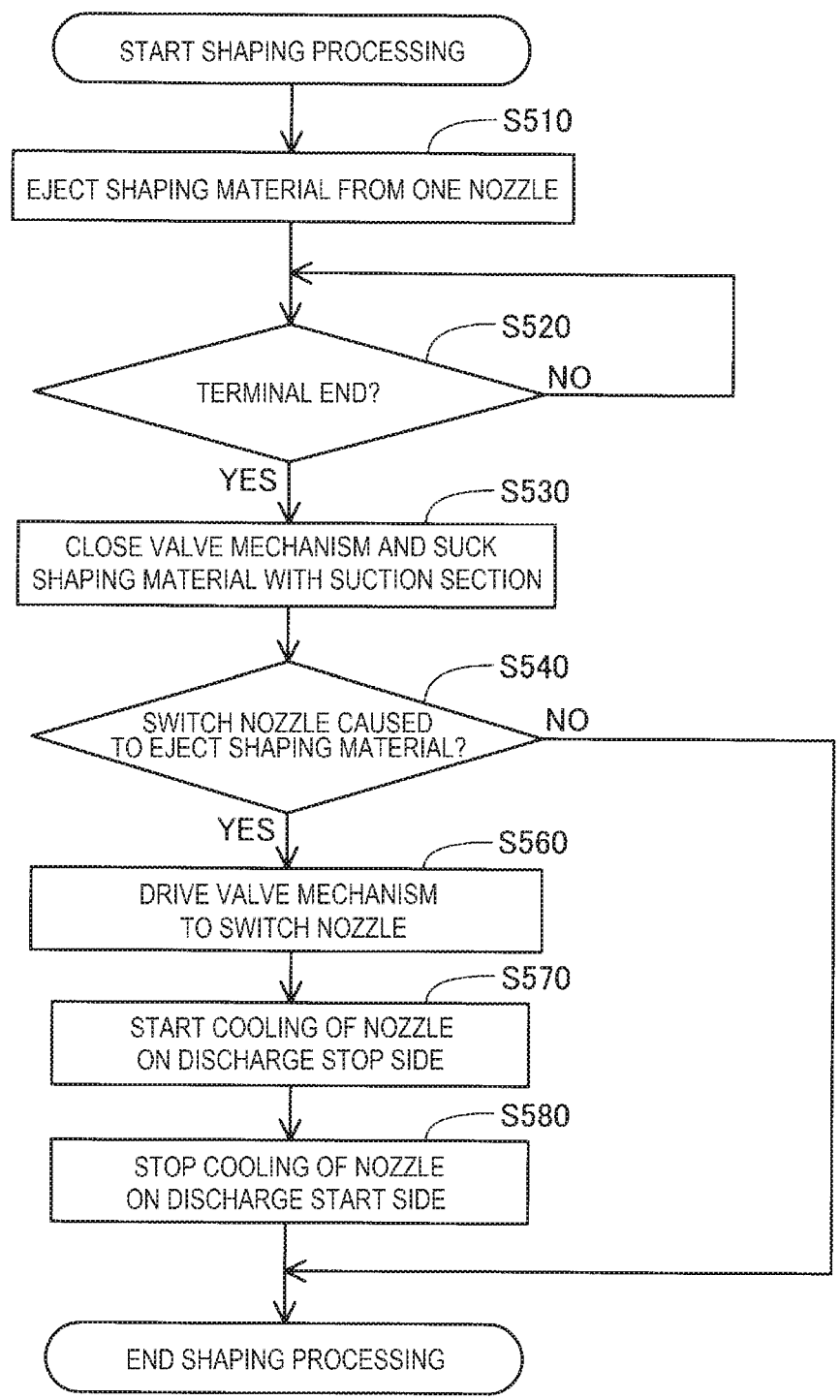
FIG. 16 is a flowchart showing content of shaping processing in the fourth embodiment.

FIG. 16 is a flowchart showing content of shaping processing in the fourth embodiment. Content of steps S510 to S530 in the shaping processing in this embodiment is the same as the content of steps S110 to S130 of the shaping processing in the first embodiment explained with reference to FIG. 10. Therefore, explanation of the content of the steps is omitted. In step S540, the control section 700 determines whether to switch the nozzle caused to eject the shaping material. When not determining in step S540 to switch the nozzle caused to eject the shaping material, the control section 700 ends the shaping processing in this shaping path and resumes the shaping processing from step S510 in order to perform shaping in the next shaping path.

On the other hand, when determining in step S540 to switch the nozzle caused to eject the shaping material, the control section 700 controls the valve mechanism 70 to thereby switch the nozzle caused to eject the shaping material and switch ON and OFF of the cooling of the first nozzle 65 and the second nozzle 66. Specifically, when the first nozzle 65 is switched to the second nozzle 66 in step S560, in step S570, the control section 700 controls the first nozzle cooling mechanism 96 to thereby start cooling of the first nozzle 65 that stops the ejection. In step S580, the control section 700 controls the second nozzle cooling mechanism 97 to thereby stop the cooling of the second nozzle 66 that resumes the ejection. When the second nozzle 66 is switched to the first nozzle 65 in step S560, in step S570, the control section 700 controls the second nozzle cooling mechanism 97 to thereby start the cooling of the second nozzle 66 that stops the ejection. In step S580, the control section 700 controls the first nozzle cooling mechanism 96 to thereby stop the cooling of the first nozzle that resumes the ejection. Thereafter, the control section 700 ends the shaping processing in this shaping path and resumes the shaping processing from step S510 in order to perform shaping of the next shaping path. The control section 700 may perform steps S560 to S580 in any order. The control section 700 may simultaneously perform steps S560 to S580.

With the three-dimensional shaping apparatus 100d in this embodiment explained above, when the first nozzle 65 is switched to the second nozzle 66, the first nozzle 65 is cooled by the first nozzle cooling mechanism 96. When the second nozzle 66 is switched to the first nozzle 65, the second nozzle 66 is cooled by the second nozzle cooling mechanism 97. Therefore, it is possible to further suppress the shaping material remaining in the nozzle in which the ejection is stopped from being denatured by heat. In particular, it is possible to further reduce the temperature of the nozzles compared with when the heating of the nozzles is stopped because the nozzles are cooled.

E. Other Embodiment (E1) In the three-dimensional shaping apparatus 100 in the first embodiment explained above, in step S230 in the material purge processing, the control section 700 causes the first plunger 82 of the first suction section 80 or the second plunger 87 of the second suction section 85 to reciprocate. However, the control section 700 may omit the processing in step S230 in the material purge processing and may not cause the first plunger 82 or the second plunger 87 to reciprocate. Even in this case, it is possible to discharge a remaining old shaping material by extruding the remaining old shaping material with a new shaping material supplied from the supply channel 61. In this case, the three-dimensional shaping apparatus 100 may not include the first suction section 80 and the second suction section 85.

(E2) The three-dimensional shaping apparatus 100 in the first embodiment and the three-dimensional shaping apparatus 100b in the second embodiment explained above may not include the first nozzle heater 91 and the second nozzle heater 92.

(E3) In the three-dimensional shaping apparatus 100 in the first embodiment and the three-dimensional shaping apparatus 100b in the second embodiment, the control section 700 executes the material purge processing when performing the switching from the first state to the second state or the switching from the second state to the first state after the predetermined period elapses from the timing when the switching from the first state to the second state or the switching from the second state to the first state is performed last time. However, the control section 700 may always execute the material purge processing when performing the switching from the first state to the second state or the switching from the second state to the first state.

(E4) In the three-dimensional shaping apparatus 100 in the first embodiment and the three-dimensional shaping apparatus 100b in the second embodiment, when the first state is switched to the second state, the control section 700 may quickly discharge the remaining shaping material from the first nozzle 65. For example, the control section 700 may discharge the remaining shaping material from the first nozzle 65 before starting the shaping of the three-dimensional shaped object with the second nozzle 66. When the first state is switched to the second state, the control section 700 may discharge the remaining shaping material from the first nozzle 65 after starting the shaping of the three-dimensional shaped object with the second nozzle 66. For example, the control section 700 may discharge the remaining shaping material from the first nozzle 65 at timing when a predetermined period elapses after the first state is switched to the second state. On the other hand, when the second state is switched to the first state, the control section 700 may quickly discharge the remaining shaping material from the second nozzle 66. For example, the control section 700 may discharge the remaining shaping material from the second nozzle 66 before starting the shaping of the three-dimensional shaped object with the first nozzle 65. When the second state is switched to the first state, the control section 700 may discharge the remaining shaping material from the second nozzle 66 after starting the shaping of the three-dimensional shaped object with the first nozzle 65. For example, the control section 700 may discharge the remaining shaping material from the second nozzle 66 at timing when a predetermined period elapses after the second state is switched to the first state.

(E5) In the three-dimensional shaping apparatuses 100, 100b, and 100d in the embodiments explained above, the melting section 30 includes the flat screw 40. However, the melting section 30 may include an inline screw longer than the flat screw 40 in the Z direction instead of the flat screw 40. The melting section 30 may not include the flat screw 40 and the inline screw and may melt the material with heating by a heating section such as a heater.

(E6) In the three-dimensional shaping apparatuses 100, 100b, and 100d in the embodiments explained above, the moving mechanism 400 is configured by the first moving mechanism 410 that moves the ejection unit 200 in the two axial directions of the X direction and the Y direction and the second moving mechanism 420 that moves the shaping table 300 in the Z direction. However, the moving mechanism 400 may move the ejection unit 200 in three axial directions of the X direction, the Y direction, and the Z direction. The moving mechanism 400 may move the shaping table 300 and the waste-material storing section 600 in the three axial directions of the X direction, the Y direction, and the Z direction without moving the ejection unit 200. In this case, the moving mechanism 400 only has to be configured to be capable of moving the material supplying mechanism 500 and supplying the material to the ejection unit 200.

(E7) In the three-dimensional shaping apparatus 100 in the first embodiment and the three-dimensional shaping apparatus 100b in the second embodiment explained above, the control section 700 discharges, in the material purge processing, the shaping material remaining in the first branch channel 63 and the first nozzle 65 or the second branch channel 64 and the second nozzle 66 toward the waste-material storing section 600, which is the region different from the shaping region. However, the control section 700 may discharge, in the material purge processing, the shaping material remaining in the first branch channel 63 and the first nozzle 65 or the second branch channel 64 and the second nozzle 66 toward a region on the shaping table 300 different from the shaping region.

(E8) The three-dimensional shaping apparatuses 100, 100b, and 100d in the embodiments explained above may not include the nozzle cleaning member 610.

F. Other Forms

The present disclosure is not limited to the embodiments explained above and can be realized in various forms in a range not departing from the gist of the present disclosure. For example, the present disclosure can also be realized by the following forms. Technical features in the embodiments explained above corresponding to technical features in the forms described below can be substituted or combined as appropriate in order to solve a part or all of the problems of the present disclosure or achieve a part or all of the effects of the present disclosure. The technical features can be deleted as appropriate unless the technical features are explained as essential technical features in this specification.

(1) According to a first form of the present disclosure, a three-dimensional shaping apparatus is provided. The three-dimensional shaping apparatus includes: a melting section configured to melt a material into a shaping material; a supply channel through which the shaping material supplied from the melting section flows; a first branch channel and a second branch channel to which the shaping material is supplied from the supply channel; a coupling section configured to couple the supply channel and the first branch channel and the second branch channel; a first nozzle communicating with the first branch channel; a second nozzle communicating with the second branch channel and having a nozzle diameter larger than a nozzle diameter of the first nozzle; a valve mechanism provided in the coupling section; a shaping table on which the shaping material ejected from the first nozzle and the second nozzle is stacked; a moving mechanism configured to change relative positions of the first nozzle and the second nozzle and the shaping table; and a control section configured to control the melting section, the valve mechanism, and the moving mechanism to thereby execute shaping processing for shaping a three-dimensional shaped object in a shaping region of the shaping table. The control section controls the valve mechanism to thereby switch a first state in which the supply channel and the first branch channel communicate and the supply channel and the second branch channel are cut off and a second state in which the supply channel and the second branch channel communicate and the supply channel and the first branch channel are cut off. In the shaping processing, when switching the second state to the first state, prior to the ejection of the shaping material from the first nozzle to the shaping region, the control section supplies the shaping material from the supply channel to the first branch channel to thereby execute first material purge processing for discharging the shaping material remaining in the first branch channel from the first nozzle to a region different from the shaping region and, when switching the first state to the second state, the control section supplies the shaping material from the supply channel to the second branch channel to thereby, prior to the ejection of the shaping material from the second nozzle to the shaping region, execute second material purge processing for discharging the shaping material remaining in the second branch channel from the second nozzle to a region different from the shaping region.

With the three-dimensional shaping apparatus in this form, when a nozzle caused to eject the shaping material is switched between the first nozzle and the second nozzle, prior to ejection of the shaping material from a nozzle on a side on which the ejection is started to the shaping region, the shaping material remaining in a branch channel and the nozzle on the side on which the ejection is started is discharged from the nozzle on the side on which the ejection is started. Therefore, it is possible to suppress deterioration in the quality of the three-dimensional shaped object.

(2) In the three-dimensional shaping apparatus in the form, the material may include thermoplastic resin, in the shaping processing, the control section may execute the first material purge processing when switching the second state to the first state after a first standby period decided according to a glass transition point of the thermoplastic resin elapses after the first state is switched to the second state and execute the second material purge processing when switching the first state to the second state after a second standby period decided according to the glass transition point of the thermoplastic resin elapses after the second state is switched to the first state, and lengths of the first standby period and the second standby period decided according to a glass transition point of second thermoplastic resin lower than a glass transition point of first thermoplastic resin may be smaller than lengths of the first standby period and the second standby period decided according to the glass transition point of the first thermoplastic resin.

With the three-dimensional shaping apparatus in this form, the remaining shaping material is discharged earlier as a glass transition point serving as an index of heat resistance of the shaping material is lower. Therefore, it is possible to more surely suppress deterioration in the quality of the three-dimensional shaped object.

(3) The three-dimensional shaping apparatus in the form may include: a first cylinder coupled to the first branch channel; a first plunger housed in the first cylinder; a second cylinder coupled to the second branch channel; and a second plunger housed in the second cylinder, and, in the first material purge processing, prior to supplying the shaping material from the supply channel to the first branch channel, the control section may drive the first plunger in a direction away from the first branch channel to thereby suck air from the first nozzle to the first branch channel and may drive the first plunger in a direction of approach to the first branch channel to thereby discharge, using the sucked air, a part of the shaping material remaining in the first branch channel from the first nozzle to the region different from the shaping region, and, in the second material purge processing, prior to supplying the shaping material from the supply channel to the second branch channel, the control section may drive the second plunger in a direction away from the second branch channel to thereby suck the air from the second nozzle to the second branch channel and may drive the second plunger in a direction of approach to the second branch channel to thereby discharge, using the sucked air, a part of the shaping material remaining in the second branch channel from the second nozzle to the region different from the shaping region.

With the three-dimensional shaping apparatus in this form, it is possible to extrude the shaping material remaining in the branch channels and the nozzles from the nozzles with the air. Therefore, it is possible to suppress occurrence of clogging of the nozzles and deterioration in the quality of the three-dimensional shaped object.

(4) The three-dimensional shaping apparatus in the form may include an air supplying mechanism capable of supplying compressed air to the first branch channel and the second branch channel, and, in the first material purge processing, prior to supplying the shaping material from the supply channel to the first branch channel, the control section may control the air supplying mechanism to thereby discharge, using the compressed air, a part of the shaping material remaining in the first branch channel from the first nozzle to the region different from the shaping region, and, in the second material purge processing, prior to supplying the shaping material from the supply channel to the second branch channel, the control section may control the air supplying mechanism to thereby discharge, using the compressed air, a part of the shaping material remaining in the second branch channel from the second nozzle to the region different from the shaping region.

With the three-dimensional shaping apparatus in this form, it is possible to extrude the shaping material remaining in the branch channels and the nozzles from the nozzles with the air. Therefore, it is possible to suppress occurrence of clogging of the nozzles and deterioration in the quality of the three-dimensional shaped object.

(5) In the three-dimensional shaping apparatus in the form, the melting section may include: a flat screw including a groove forming surface on which a groove is formed; and a barrel including a heater and including a screw counter surface opposed to the groove forming surface, and may melt the material into the shaping material with rotation of the flat screw and heating of the heater.

With the three-dimensional shaping apparatus in this form, since the shaping material is melted by a small flat screw, it is possible to reduce the three-dimensional shaping apparatus in size.

(6) According to a second form of the present disclosure, a three-dimensional shaping apparatus is provided. The three-dimensional shaping apparatus includes: a melting section configured to melt a material into a shaping material; a supply channel through which the shaping material supplied from the melting section flows; a first branch channel and a second branch channel to which the shaping material is supplied from the supply channel; a coupling section configured to couple the supply channel and the first branch channel and the second branch channel; a first nozzle communicating with the first branch channel; a second nozzle communicating with the second branch channel and having a nozzle diameter larger than a nozzle diameter of the first nozzle; a valve mechanism provided in the coupling section; a first nozzle heater configured to heat the first nozzle and a second nozzle heater configured to heat the second nozzle; a shaping table on which the shaping material ejected from the first nozzle and the second nozzle is stacked; a moving mechanism configured to change relative positions of the first nozzle and the second nozzle and the shaping table; and a control section configured to control the melting section, the valve mechanism, the moving mechanism, the first nozzle heater, and the second nozzle heater to thereby execute shaping processing for shaping a three-dimensional shaped object in a shaping region of the shaping table. The control section controls the valve mechanism to thereby switch a first state in which the supply channel and the first branch channel communicate and the supply channel and the second branch channel are cut off and a second state in which the supply channel and the second branch channel communicate and the supply channel and the first branch channel are cut off. The control section controls the first nozzle heater and the second nozzle heater to thereby, when switching the first state to the second state, stop heating of the first nozzle by the first nozzle heater and start heating of the second nozzle by the second nozzle heater and, when switching the second state to the first state, start the heating of the first nozzle by the first nozzle heater and stop the heating of the second nozzle by the second nozzle heater.

With the three-dimensional shaping apparatus in this form, heating of a nozzle in which ejection of the shaping material is stopped of the first nozzle and the second nozzle is stopped. Therefore, denaturation of the shaping material remaining in the nozzle in which the ejection of the shaping material is stopped is suppressed.

(7) According to a third form of the present disclosure, a three-dimensional shaping apparatus is provided. The three-dimensional shaping apparatus includes: a melting section configured to melt a material into a shaping material; a supply channel through which the shaping material supplied from the melting section flows; a first branch channel and a second branch channel to which the shaping material is supplied from the supply channel; a coupling section configured to couple the supply channel and the first branch channel and the second branch channel; a first nozzle communicating with the first branch channel; a second nozzle communicating with the second branch channel and having a nozzle diameter larger than a nozzle diameter of the first nozzle; a valve mechanism provided in the coupling section; a first nozzle cooling mechanism configured to cool the first nozzle and a second nozzle cooling mechanism configured to cool the second nozzle; a shaping table on which the shaping material ejected from the first nozzle and the second nozzle is stacked; a moving mechanism configured to change relative positions of the first nozzle and the second nozzle and the shaping table; and a control section configured to control the melting section, the valve mechanism, the moving mechanism, the first nozzle cooling mechanism, and the second nozzle cooling mechanism to thereby execute shaping processing for shaping a three-dimensional shaped object in a shaping region of the shaping table. The control section controls the valve mechanism to thereby switch a first state in which the supply channel and the first branch channel communicate and the supply channel and the second branch channel are cut off and a second state in which the supply channel and the second branch channel communicate and the supply channel and the first branch channel are cut off. The control section controls the first nozzle cooling mechanism and the second nozzle cooling mechanism to thereby, when switching the first state to the second state, start cooling of the first nozzle by the first nozzle cooling mechanism and stop cooling of the second nozzle by the second nozzle cooling mechanism and, when switching the second state to the first state, stop the cooling of the first nozzle by the first nozzle cooling mechanism and start the cooling of the second nozzle by the second nozzle cooling mechanism.

With the three-dimensional shaping apparatus in this form, a nozzle in which ejection of the shaping material is stopped of the first nozzle and the second nozzle is cooled. Therefore, denaturation of the shaping material remaining in the nozzle in which the ejection of the shaping material is stopped is suppressed.

The present disclosure can be realized in various forms other than the three-dimensional shaping apparatus. For example, the present disclosure can be realized in forms such as a control method for the three-dimensional shaping apparatus, a purging method for the shaping material, and a denaturation suppressing method for the shaping material.

What is claimed is:

1. A three-dimensional shaping apparatus comprising:
   a melting section configured to melt a material into a shaping material;
   a supply channel through which the shaping material supplied from the melting section flows;
   a first branch channel and a second branch channel to which the shaping material is supplied from the supply channel;
   a coupling section configured to couple the supply channel and the first branch channel and the second branch channel;
   a first nozzle communicating with the first branch channel;
   a second nozzle communicating with the second branch channel and having a nozzle diameter larger than a nozzle diameter of the first nozzle;
   a valve mechanism provided in the coupling section;
   a shaping table on which the shaping material ejected from the first nozzle and the second nozzle is stacked;
   a moving mechanism configured to change relative positions of the first nozzle and the second nozzle and the shaping table; and
   a control section configured to control the melting section, the valve mechanism, and the moving mechanism to thereby execute shaping processing for shaping a three-dimensional shaped object in a shaping region of the shaping table, wherein
   the control section controls the valve mechanism to thereby switch a first state in which the supply channel and the first branch channel communicate and the supply channel and the second branch channel are cut off and a second state in which the supply channel and the second branch channel communicate and the supply channel and the first branch channel are cut off, and
   in the shaping processing
   when switching the second state to the first state and a first standby period has elapsed after the switching the first state to the second state, prior to the ejection of the shaping material from the first nozzle to the shaping region, the control section supplies the shaping material from the supply channel to the first branch channel to thereby execute first material purge processing for discharging the shaping material remaining in the first branch channel from the first nozzle to a region different from the shaping region, and
   when switching the first state to the second state and a second standby period has elapsed after the switching the second state to the first state, the control section supplies the shaping material from the supply channel to the second branch channel to thereby, prior to the ejection of the shaping material from the second nozzle to the shaping region, execute second material purge processing for discharging the shaping material remaining in the second branch channel from the second nozzle to a region different from the shaping region, wherein the first and second standby periods are determined according to a type of the material.

2. The three-dimensional shaping apparatus according to claim 1, wherein
   the material includes thermoplastic resin,
   in the shaping processing, the control section executes the first material purge processing when switching the second state to the first state after the first standby period decided according to a glass transition point of the thermoplastic resin elapses after the first state is switched to the second state and executes the second material purge processing when switching the first state to the second state after the second standby period decided according to the glass transition point of the thermoplastic resin elapses after the second state is switched to the first state, and
   lengths of the first standby period and the second standby period decided according to a glass transition point of second thermoplastic resin lower than a glass transition point of first thermoplastic resin are smaller than lengths of the first standby period and the second standby period decided according to the glass transition point of the first thermoplastic resin.

3. The three-dimensional shaping apparatus according to claim 1, further comprising:
   a first cylinder coupled to the first branch channel;
   a first plunger housed in the first cylinder;
   a second cylinder coupled to the second branch channel; and
   a second plunger housed in the second cylinder, wherein in the first material purge processing, prior to supplying the shaping material from the supply channel to the first branch channel, the control section drives the first plunger in a direction away from the first branch channel to thereby suck air from the first nozzle to the first branch channel and drives the first plunger in a direction of approach to the first branch channel to thereby discharge, using the sucked air, a part of the shaping material remaining in the first branch channel from the first nozzle to the region different from the shaping region, and in the second material purge processing, prior to supplying the shaping material from the supply channel to the second branch channel, the control section drives the second plunger in a direction away from the second branch channel to thereby suck the air from the second nozzle to the second branch channel and drives the second plunger in a direction of approach to the second branch channel to thereby discharge, using the sucked air, a part of the shaping material remaining in the second branch channel from the second nozzle to the region different from the shaping region.

4. The three-dimensional shaping apparatus according to claim 1, further comprising an air supplying mechanism configured to supply compressed air to the first branch channel and the second branch channel, wherein in the first material purge processing, prior to supplying the shaping material from the supply channel to the first branch channel, the control section controls the air supplying mechanism to thereby discharge, using the compressed air, a part of the shaping material remaining in the first branch channel from the first nozzle to the region different from the shaping region, and in the second material purge processing, prior to supplying the shaping material from the supply channel to the second branch channel, the control section controls the air supplying mechanism to thereby discharge, using the compressed air, a part of the shaping material remaining in the second branch channel from the second nozzle to the region different from the shaping region.

5. The three-dimensional shaping apparatus according to claim 1, wherein the melting section includes:

a flat screw including a groove forming surface on which a groove is formed; and a barrel including a heater and including a screw counter surface opposed to the groove forming surface, and the melting section melts the material into the shaping material with rotation of the flat screw and heating of the heater.

6. A control method for a three-dimensional shaping apparatus, the three-dimensional shaping apparatus including:

a melting section configured to melt a material into a shaping material;

a supply channel through which the shaping material supplied from the melting section flows;

a first branch channel and a second branch channel to which the shaping material is supplied from the supply channel;

a coupling section configured to couple the supply channel and the first branch channel and the second branch channel;

a first nozzle communicating with the first branch channel;

a second nozzle communicating with the second branch channel and having a nozzle diameter larger than a nozzle diameter of the first nozzle;

a valve mechanism provided in the coupling section, the valve mechanism including a valve member, the valve member having a notch;

a shaping table on which the shaping material ejected from the first nozzle and the second nozzle is stacked; and a moving mechanism configured to change relative positions of the first nozzle and the second nozzle and the shaping table, the control method comprising:

controlling the melting section, the valve mechanism, and the moving mechanism to shape a three-dimensional shaped object in a shaping region of the shaping table;

in a period in which the three-dimensional shaped object is shaped, controlling the valve mechanism to thereby switch a first state in which the supply channel and the first branch channel communicate and the supply channel and the second branch channel are cut off and a second state in which the supply channel and the second branch channel communicate and the supply channel and the first branch channel are cut off;

when switching the second state to the first state, prior to the ejection of the shaping material from the first nozzle to the shaping region, supplying the shaping material from the supply channel to the first branch channel to thereby discharge the shaping material remaining in the first branch channel from the first nozzle to a region different from the shaping region; and when switching the first state to the second state, supplying the shaping material from the supply channel to the second branch channel to thereby, prior to the ejection of the shaping material from the second nozzle to the shaping region, discharge the shaping material remaining in the second branch channel from the second nozzle to a region different from the shaping region, wherein a flow rate of the shaping material in the coupling section is adjusted by a location, relative to the first and second branch channels, of the notch of the valve member that is configured to rotate in the coupling section.

* * * * *